(12) United States Patent
Oaku et al.

(10) Patent No.: US 7,786,659 B2
(45) Date of Patent: Aug. 31, 2010

(54) PLASMA DISPLAY WITH A NOVEL GREEN-SILICATE PHOSPHOR

(75) Inventors: Hitoshi Oaku, Tokyo (JP); Hirotaka Sakuma, Kokubunji (JP); Choichiro Okazaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 12/140,624

(22) Filed: Jun. 17, 2008

(65) Prior Publication Data
US 2009/0058255 A1   Mar. 5, 2009

(30) Foreign Application Priority Data
Aug. 31, 2007   (JP) .............................. 2007-226642

(51) Int. Cl.
*H01J 11/02* (2006.01)
*H01L 33/00* (2010.01)
*C09K 11/08* (2006.01)

(52) U.S. Cl. ...................... 313/486; 313/586; 313/587; 313/582; 252/301.4 F

(58) Field of Classification Search ......... 313/581–587, 313/486; 252/301.4 F
See application file for complete search history.

(56) References Cited

U.S. PATENT DOCUMENTS

| 2005/0264161 A1* | 12/2005 | Oaku et al. ................. 313/486 |
| 2006/0145123 A1* | 7/2006 | Li et al. ................. 252/301.4 F |
| 2006/0202620 A1* | 9/2006 | Shinoda et al. ............. 313/582 |

FOREIGN PATENT DOCUMENTS

| JP | 2002332481 | 11/2002 |
| JP | 2003-142004 | 5/2003 |

OTHER PUBLICATIONS

Phosphor Handbook, edited by S. Shionoya, et al, CRC Press, Chapter 10, pp. 623-636.
"Fluorescence of $EU^{2+}$-Activated Silicates" by G. Blasse, et al.

* cited by examiner

*Primary Examiner*—Sikha Roy
*Assistant Examiner*—Tracie Green
(74) *Attorney, Agent, or Firm*—Mattingly & Malur, P.C.

(57) ABSTRACT

Using $Eu^{2+}$ as the luminescence center for a green-emitting phosphor, a plasma display panel and a PDP device using it are configured by using an $Eu^{2+}$-activated silicate green-emitting phosphate $(Ca_{1-x}M1_x)_{2-e}.M2.Si_2O_7:Eu_e$ with improved decay characteristics. In the formula, M1 is at least one element selected from the group containing Sr and Ba; M2 is at least one element selected from the group containing Mg and Zn; and x indicates the mole fraction of the component M1 and e indicates the mole fraction of Eu respectively satisfy the following conditions: $0<x<1$ and $0.001 \leq e \leq 0.2$.

15 Claims, 10 Drawing Sheets

FIG. 2

| PHOSPHOR | CONDITION OF EXCITATION BY ULTRAVIOLET LIGHT AT 172nm | | | | CONDITION OF EXCITATION BY ULTRAVIOLET LIGHT AT 146nm | | | |
|---|---|---|---|---|---|---|---|---|
| | CHROMATICITY | | THE MAXIMUM OF THE EMISSION BAND | | CHROMATICITY | | THE MAXIMUM OF THE EMISSION BAND | |
| | x VALUE | y VALUE | WAVELENGTH (nm) | INTENSITY RATIO | x VALUE | y VALUE | WAVELENGTH (nm) | INTENSITY RATIO |
| $Ca_{1.98}MgSi_2O_7:Eu_{0.02}$ | 0.64 | 0.58 | 536 | 1.0 | 0.36 | 0.58 | 536 | 1.0 |
| $(Ca_{0.9}Ba_{0.1})_{1.98}MgSi_2O_7:Eu_{0.02}$ | 0.34 | 0.58 | 532 | 0.87 | 0.28 | 0.42 | 532 | 0.71 |
| $(Ca_{0.9}Sr_{0.1})_{1.98}MgSi_2O_7:Eu_{0.02}$ | 0.33 | 0.59 | 528 | 1.2 | 0.32 | 0.58 | 532 | 1.3 |

FIG. 9

| MOLE FRACTION OF Sr (%) | RELATIVE PHOTOLUMINESCENT BRIGHTNESS | THE WAVELENGTH OF THE MAXIMUM OF THE EMISSION BAND (nm) | CHROMATICITY x | CHROMATICITY y |
|---|---|---|---|---|
| 0%Sr | 100 | 540 | 0.37 | 0.58 |
| 10%Sr | 116 | 532 | 0.33 | 0.59 |
| 20%Sr | 114 | 524 | 0.31 | 0.59 |
| 30%Sr | 128 | 520 | 0.27 | 0.59 |
| 40%Sr | 103 | 512 | 0.25 | 0.57 |
| 50%Sr | 103 | 504 | 0.21 | 0.53 |
| 60%Sr | 95 | 496 | 0.18 | 0.48 |
| 70%Sr | 83 | 492 | 0.16 | 0.41 |
| 100%Sr | 63 | 468 | 0.13 | 0.17 |

PLASMA DISPLAY WITH A NOVEL GREEN-SILICATE PHOSPHOR

CLAIM OF PRIORITY

The present application claims priority from Japanese patent application JP 2007-226642 filed on Aug. 31, 2007, the content of which is hereby incorporated by reference into this application.

FIELD OF THE INVENTION

The present invention relates to a plasma display device, in particular, it relates to a plasma display device such as a plasma display panel using a phosphor, specifically, a Eu (europium) activated silicate green-emitting phosphor which emits the light by being exciting by ultraviolet light in the vacuum ultraviolet region as a light emitting device.

BACKGROUND OF THE INVENTION

In recent years, there has been an increasing demand to reduce the thickness of display devices represented by television sets and monitors for personal computers for saving installation space. As a display device capable of being made thin, the development of liquid crystal displays (LCD) has been aggressively pursued in which a display device is composed of a plasma display device (PDP (Plasma Display Panel) device), a field emission display (FED), a back light, and thin liquid crystal panel.

The PDP device is an imaging device using a plasma display panel (PDP) as the light emitting device. The PDP is so configured as to emit light in the visible region by exciting a phosphor which is arranged in the phosphor layer in the micro discharge space using ultraviolet light as an excitation source generated in a negative glow region in the micro discharge space containing a rare gas (it is in the wavelength region from 146 nm to 172 nm when Xe (xenon) is used as the rare gas). The PDP device uses this emitted light by controlling the intensity and color thereof. Therefore, phosphor becomes very important as a main component for constituting a PDP device.

As documents including this kind of material and technology, for instance, JP-A-2002-332481 (patent document 1), JP-2003-142004 (patent document 2), [PHOSPHOR HANDBOOK] CRC Press 1998, Edited by Shigeo Shionoya, William M. Yen, Part III Chapter 10 pp 623-636 (non-patent document 1), and "G. Blasse, W. L. Wanmaker, J. W. ter Vrugt and A. Bril, Philips Res. Repts. 23, p 189~200 (1968) (non-patent document 2)" are provided.

SUMMARY OF THE INVENTION

Recently, PDP devices having high performance are gaining recognition and are replacing monitors and television sets (TV) using cathode ray tubes, thereby, the use of large flat panel displays and thin TV sets has been rapidly expanding. As a result, there has been a demand for further improvements in performance. Concretely, there has been a demand to realize higher luminance for satisfying the display function for the television, higher emission efficiency for achieving higher luminance, to ensure a wide color reproduction range for replaying beautiful images, and to improve the video characteristics to allow viewers to comfortably appreciate video content such as movies.

For promoting higher performance of the PDP device, improvements in design and structure and improvements in the performance of the components specifically, the phosphor used in it, play important roles. Therefore, improvements in the emission efficiency and improvements in the response characteristics in the light emission are required of the phosphor.

Conventionally, as phosphors of the plane discharge type color AC-PDP device, phosphors corresponding to the three emission colors of red (R), green (G), and blue (B) are used. As a green-emitting phosphor, generally a manganese ion ($Mn^{2+}$) activated zinc silicate phosphor, $Zn_2SiO_4$:Mn, is used. This $Mn^{2+}$ activated zinc silicate phosphor, $Zn_2SiO_4$:Mn has excellent characteristics in its photoluminescent brightness and emission efficiency, but it has a problem where the decay characteristics are lower than phosphors emitting other colors, so that it has been pointed out as a problem to be solved in these days.

Worse decay characteristics mean that the time for decay is long and, if such a phosphor is used for a display device, a phenomenon occurs where the color from the previous image remains on the display screen although the display has been switched. Therefore, when the use for televisions comes within sight and an improvement of the video characteristics is a strong requirement, there is a possibility that a problem such as decay which decreases the display quality becomes a serious concern.

Moreover, in the technical field of the PDP, along with a discussion about achieving high performance of the phosphor materials, improvements in the PDP structure aimed at high emission efficiency of the PDP device for high performance TV sets have been discussed.

As a specific method thereof, a technique for actively utilizing a $Xe_2$ molecular line (wavelength 172 nm) generated by the electric discharge by increasing the mole fraction of Xe gas contained in a discharge gas including Ne (neon) as a main component has actively been discussed. It is a trend of a so-called high xenon technology in PDP. However, achievement of high emission efficiency of a PDP has been discussed in a region where the mole fraction thereof is generally higher than the mole fraction of Xe gas in the discharge gas (about 4%). Sometimes there is a case where the $Xe_2$ molecular line is expressed as the wavelength of 173 nm in persons skilled in the art, but both are generally recognized for expressing the wavelength characteristics of the same $Xe_2$ molecular line. In the present invention, the $Xe_2$ molecular line is uniformly expressed as a wavelength of 172 nm.

It becomes possible to use widely a PDP device where high efficiency is achieved as a result of such a technology development, from simple thin display devices to flat TV sets which replace TV sets using a cathode ray tube. The level of demand for improvements in the image quality, in particular, the video characteristics becomes higher and higher; there is focus on the decay characteristics of the phosphor which has not been focused on so much as a problem, and there is a strong demand to improve the decay characteristics in the aforementioned green-emitting phosphor.

As a result, in the trend of the high xenon technology in PDP and the trend of expanding the utilization of PDP devices for TV, there is a strong demand for a new green-emitting phosphor having a short decay, which is substituted for the $Mn^{2+}$-activated zinc silicate phosphor $Zn_2SiO_4$:Mn having poor decay characteristics or where a part of the $Mn^{2+}$-activated zinc silicate phosphor $Zn_2SiO_4$:Mn can be replaced by using a mixture thereof.

In this case, it is necessary that the new green-emitting phosphor be efficiently excited by the $Xe_2$ molecular line which is a main phosphor excitation source, that is, ultraviolet light having a wavelength of 172 nm and emits light when the PDP uses the high xenon technology in addition to ultraviolet light having a wavelength of 146 nm generated by discharge. Sometimes there is a case where the $Xe_2$ emission is expressed as the wavelength of 147 nm in persons skilled in the art, but both are generally recognized for expressing the wavelength characteristics of the same $Xe_2$ molecular line. In the present invention, the $Xe_2$ emission is uniformly expressed as the wavelength of 146 nm.

Accordingly, a problem to be solved by the present invention is an improvement in the decay characteristics of the green-emitting phosphor, notably a $Mn^{2+}$ activated zinc silicate phosphor, $Zn_2SiO_4$:Mn, which is capable of being used for the PDP device. In particular, it is an objective to achieve an improvement in the characteristics of the green-emitting phosphor such that it is possible to have both the decay characteristics of the green-emitting phosphor and the emission characteristics of other phosphors upon the excitation by light at a wavelength of 172 nm and to achieve an improvement in the performance of the PDP device using high xenon technology corresponding to the trend of high efficiency technology in a PDP.

It is an object of the present invention to provide a green-emitting phosphor having excellent decay characteristics which can replace a conventional green-emitting phosphor, $Mn^{2+}$-activated zinc silicate phosphor $Zn_2SiO_4$:Mn, and to provide a PDP device where it is possible to improve the decay characteristics by using it.

Another object of the present invention is to provide a PDP device where the decay characteristics of the phosphor and the color characteristics of the emission can be improved and where the trend of high xenon technology for high efficiency in a PDP can be applied.

The aforementioned and other problems to be solved by the present invention, the aforementioned and other objects, and new characteristics will be apparent from the description of the specification and the accompanying drawings.

The typical ones of the inventions disclosed in this application will be briefly described as follows.

A plasma display device of the embodiment comprises: a pair of substrates arranged at a distance so as to face each other; barrier ribs arranged between the pair of substrates for forming a space between the pair of substrates; an electrode pair arranged over at least one facing side of the pair of substrates; a discharge gas sealed in the space formed by the barrier ribs for generating ultraviolet light as a result of electric discharge upon application of a voltage to the electrode pair; and a phosphor layer containing a phosphor for emitting light as a result of excitation by the ultraviolet light formed over at least one of the facing sides of the pair of substrates and wall surfaces of the barrier rib in the space, in which the phosphor contains a $Eu^{2+}$-activated silicate green-emitting phosphor represented by $(Ca_{1-x}M1_x)_{2-e}M2.Si_2O_7$:$Eu_e$; in the aforementioned formula, M1 is at least one element selected from the group containing Sr and Ba; M2 is at least one element selected from the group containing Mg and Zn; and x indicates the mole fraction of the component M1 and e indicates the mole fraction of Eu respectively satisfy the following conditions: $0 < x < 1$ and $0.001 \leq e \leq 0.2$.

A plasma display device of the embodiment comprises: a pair of substrates arranged at a distance so as to face each other; barrier ribs arranged between the pair of substrates for forming a space between the pair of substrates; an electrode pair arranged over at least one facing side of the pair of substrates; a discharge gas sealed in the space formed by the barrier ribs for generating ultraviolet light as a result of electric discharge upon application of a voltage to the electrode pair; and a phosphor layer containing a phosphor for emitting light as a result of excitation by the ultraviolet light formed over at least one of the facing side of the pair of substrates and wall surfaces of the barrier rib in the space, in which the phosphor contains a $Eu^{2+}$-activated silicate green-emitting phosphor; the $Eu^{2+}$-activated silicate green-emitting phosphor is represented by $(Ca_{1-x}M1_x)_{2-e}.M2.Si_2O_7$:$Eu_e$; and light is emitted with a color having chromaticity (x, y) in the XYZ color system of CIE when it is excited by the ultraviolet light where the X is $0.15 \leq x$ value $\leq 0.35$ and the y is $0.45 \leq y$ value $\leq 0.75$: in the aforementioned formula, M1 is at least one element selected from the group containing Sr and Ba; M2 is at least one element selected from the group containing Mg and Zn; and x indicates the mole fraction of the component M1 and e indicates the mole fraction of Eu respectively satisfy the following conditions $0 < x < 1$ and $0 \leq e \leq 1$.)

The effects obtained by typical aspects of the present invention will be briefly described below.

A PDP device of the embodiment can achieve excellent decay characteristics because a novel green-emitting phosphor, a $Eu^{2+}$-activated silicate green-emitting phosphor, having shorter decay is used as aspects of alternating a $Mn^{2+}$-activated zinc silicate phosphor, $Zn_2SiO_4$:Mn, which has lower decay characteristics or as a partial replacement by mixing them.

Moreover, a PDP device of the embodiment uses a $Eu^{2+}$-activated silicate green-emitting phosphor having a preferable emission efficiency only upon excitation by ultraviolet light at a wavelength of 146 nm but also upon excitation by ultraviolet light at a wavelength of 172 nm which plays a main role as an excitation source in a PDP using a high xenon technology, resulting in excellent emission characteristics being obtained.

Moreover, in a PDP device of this embodiment, a PDP so configured uses a $Eu^{2+}$-activated silicate green-emitting phosphor having excellent decay characteristics and preferable emission characteristics, thereby preferable video images are achieved.

BRIEF DESCRIPTION OF THE DRAWINGS

FIG. 2 is an explanatory table summarizing the analytical data of the emission characteristics and emission spectra of the novel $Eu^{2+}$-activated silicate green-emitting phosphors of an embodiment in the present invention and a phosphor having the base composition;

FIG. 9 is an explanatory diagram summarizing the evaluation results of the emission characteristics upon excitation by vacuum ultraviolet light at a wavelength of 172 nm as examples of the novel phosphor and a phosphor having a base composition constituting a PDP device of an embodiment of the present invention;

DETAILED DESCRIPTION OF THE PREFERRED EMBODIMENTS

Figure 1:
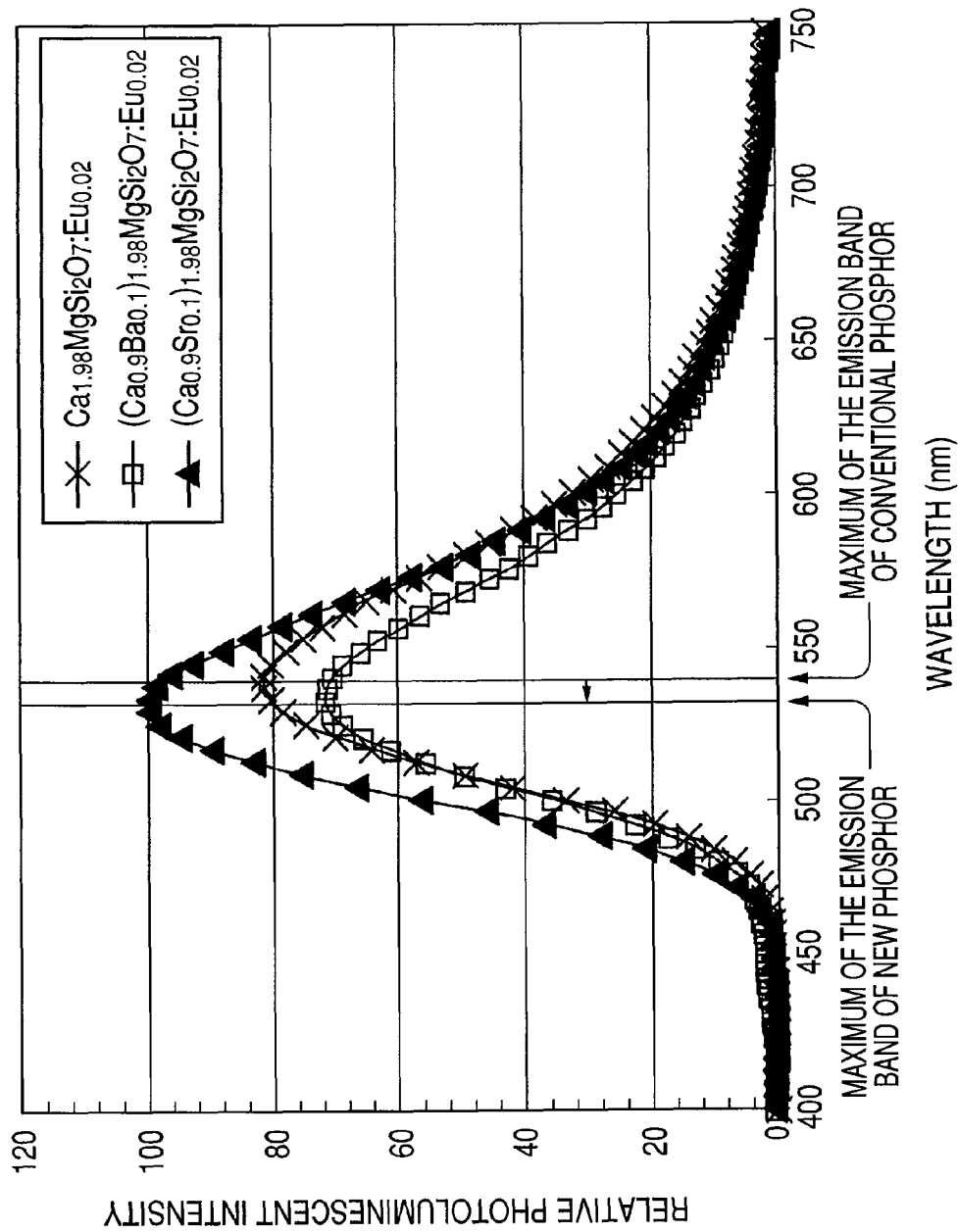
FIG. 1 is an explanatory diagram illustrating emission spectra upon excitation by vacuum ultraviolet light at a wavelength of 172 nm as examples of the novel $Eu^{2+}$-activated silicate green-emitting phosphor and a phosphor having the base component in an emission device of an embodiment of the present invention.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

A conventional green-emitting phosphor for a PDP uses a $Mn^{2+}$-activated zinc silicate phosphor, $Zn_2SiO_4$:Mn. Therefore, in the PDP device, the green-emitting phosphor has poor decay characteristics compared with other color emitting phosphors and the decay time defined as the time where the emission intensity of the phosphor is lowered to 1/10 is as long as 10 ms which is the performance of the $Mn^{2+}$-activated zinc silicate phosphor, $Zn_2SiO_4$:Mn. As a result, with a PDP device using the $Mn^{2+}$-activated zinc silicate phosphor, $Zn_2SiO_4$:Mn, there is a concern about the decay characteristics when the discharge gas is made to have high efficiency using high xenon technology and the use for televisions mainly including video displays comes within sight. Therefore, there is a fear that the video display performance of the PDP device using a PDP including the $Mn^{2+}$-activated zinc silicate phosphor, $Zn_2SiO_4$:Mn will not be adequate.

On the other hand, with regard to other color-emitting phosphors, for instance, a blue-emitting phosphor has a decay time as short as 1 ms and a short decay, thereby a problem of decay similar to the green-emitting phosphor which is the $Mn^{2+}$-activated zinc silicate phosphor, $Zn_2SiO_4$:Mn, is not being pointed out.

The difference of decay characteristics between these phosphors originates in the composition and, specifically, the luminescence centre. In a word, the luminescence centre is $Mn^{2+}$ in the $Mn^{2+}$-activated zinc silicate phosphor, $Zn_2SiO_4$:Mn and, as a characteristic of this luminescence centre $Mn^{2+}$, the decay time is long, thereby the decay characteristics are deteriorated.

On the other hand, a $Eu^{2+}$-activated aluminate phosphor which is a typical blue-emitting phosphor for PDP, for instance, $BaMgAl_{10}O_{17}$:$Eu^{2+}$ has a $Eu^{2+}$ luminescence centre, and the decay time thereof is short according to the characteristic of the $Eu^{2+}$ luminescence center, resulting specifically in a problem not being generated in the decay characteristics.

Therefore, it is understood that the problem of decay can be decreased if the luminescence center in the green-emitting phosphor can be changed from $Mn^{2+}$ to another element. It is understood that the problem of decay can be decreased if $Eu^{2+}$ can be used as the luminescence center as well as a blue-emitting phosphor.

However, there are very few concrete examples of a phosphor having $Eu^{2+}$ which emits green light excited by the vacuum ultraviolet light as the luminescence center for PDP usage. For instance, although there is a $Eu^{2+}$-activated silicate phosphor, $Ca_2MgSi_2O_7$:$Eu^{2+}$, having a characteristic of short decay upon excitation by light in ultraviolet region at a wavelength of 254 nm (non-patent document 2), the emission color upon excitation by ultraviolet light at a wavelength of 254 nm is closer to yellow rather than green and, if similar emission color characteristics are shown even under excitation by vacuum ultraviolet light, there is a problem for PDP usage with respect to color reproduction and color. Specifically, a PDP device with beautiful emission cannot be configured when similar emission color characteristics are shown even upon excitation by vacuum ultraviolet light.

The inventors note the $Eu^{2+}$-activated silicate phosphor $Ca_2MgSi_2O_7$:$Eu^{2+}$ again and evaluate the emission characteristics and, specifically, the emission color characteristics upon excitation by vacuum ultraviolet light when the use for PDP device comes within sight. In addition, they worked toward improvement of the composition based on it and synthesis of phosphor material having a new composition.

As a result, the inventors have realized a silicate green-emitting phosphor capable of achieving high luminance upon excitation by vacuum ultraviolet light, specifically, by light at a wavelength of 172 nm and a PDP with high luminance, that is, a PDP device enabling high luminance has been realized by using it.

Moreover, the inventors have realized a silicate phosphor capable of achieving a preferable green emission upon excitation by light at a wavelength of 172 nm and, by use of it, a PDP with high luminance, that is, a PDP device enabling high luminance has been realized.

The newly achieved $Eu^{2+}$-activated silicate green-emitting phosphor achieved is a $Eu^{2+}$-activated silicate green-emitting phosphor represented by the following general formula (1)

$$(Ca_{1-x}M1_x)_{2-e}.M2.Si_2O_7:Eu_e \qquad (1)$$

In the general formula (1), M1 is at least one element selected from the group containing Sr and Ba; M2 is at least one element selected from the group containing Mg and Zn; and x indicates the mole fraction of the component M1 and e indicates the mole fraction of Eu respectively satisfy the following conditions: $0<x<1$ and $0.001 \leq e \leq 0.2$.

The inventors used a $Eu^{2+}$-activated silicate phosphor $Ca_2MgSi_2O_7$:$Eu^{2+}$ as a base of the phosphor in which the component M2 in the general formula (1) is Mg and developed a phosphor where the host composition is improved by replacement of a portion of the Ca elements, which is the host lattice component, by at least one selected from Sr and Ba. As a result, the emission spectrum upon excitation by vacuum ultraviolet light, which is a main phosphor emission characteristic, can be successfully shifted to the low wavelength side and, as a result, it was discovered that the color of emissions excited by vacuum ultraviolet light is purified to a high level as a green color. Hereinafter, the discussion and the consideration will be described more in detail.

The inventors newly synthesized $(Ca_{0.9}Ba_{0.1})_{1.98}MgSi_2O_7:Eu_{0.02}$ and $(Ca_{0.9}Sr_{0.1})_{1.98}MgSi_2O_7:Eu_{0.02}$ as an example of a $Eu^{2+}$-activated silicate green-emitting phosphor which is an embodiment of the present invention. In order to compare them with the $Eu^{2+}$-activated silicate phosphor $Ca_2MgSi_2O_7:Eu^{2+}$ having a composition to be a base, the measurement of the emission spectrum and evaluation of the emission color characteristics and other emission characteristics were performed by using a vacuum ultraviolet light excimer lamp having a central emission wavelength of 172 nm according to an established rule.

FIG. 1 shows emission spectra upon excitation by vacuum ultraviolet light at a wavelength of 172 nm of $[(Ca_{0.9}Ba_{0.1})_{1.98}MgSi_2O_7:Eu_{0.02}$ and $(Ca_{0.9}Sr_{0.1})_{1.98}MgSi_2O_7:Eu_{0.02}]$ as examples of the novel $Eu^{2+}$-activated silicate green-emitting phosphor in an embodiment of the present invention and $Ca_{1.98}MgSi_2O_7:Eu_{0.02}$ as a phosphor having the base composition.

It is understood from discussion of the results that, as shown in FIG. 1, the obtained whole emission spectra of both $[(Ca_{0.9}Ba_{0.1})_{1.98}MgSi_2O_7:Eu_{0.02}$ and $(Ca_{0.9}Sr_{0.1})_{1.98}MgSi_2O_7:Eu_{0.02}]$ which are the novel $Eu^{2+}$-activated silicate green-emitting phosphors of the embodiment in the present invention are shifted to the lower wavelength side compared with the emission spectra of $Ca_{1.98}MgSi_2O_7:Eu^{2+}_{0.02}$ which is the phosphor having the base composition.

Moreover, as the results of the evaluation which are summarized and described in FIG. 2, in the chromaticity (x, y) on the CIE (International Commission on Illumination) XYZ calorimetric scale which represents the emission color of the phosphor, the x value and y value therein are the chromaticity (x, y)=(0.64, 0.58), respectively, in the $Ca_{1.98}MgSi_2O_7:Eu_{0.02}$ which is the phosphor having the base composition. It has a remarkably large x value and a yellowish emission color. On the other hand, the chromaticity of the novel $Eu^{2+}$-activated silicate green-emitting phosphors, $(Ca_{0.9}Ba_{0.1})_{1.98}MgSi_2O_7:Eu_{0.02}$, is a chromaticity (x, y)=(0.34, 0.58) and the chromaticity (x, y) of the novel $Eu^{2+}$-activated silicate green-emitting phosphors, $(Ca_{0.9}Sr_{0.1})_{1.98}MgSi_2O_7:Eu_{0.02}$, is (x, y)=(0.33, 0.59).

Specifically, it is understood that the x value of the chromaticity (x, y) of the $[(Ca_{0.9}Ba_{0.1})_{1.95}MgSi_2O_7:Eu_{0.02}$ and $(Ca_{0.9}Sr_{0.1})_{1.98}MgSi_2O_7:Eu_{0.02}]$ which are the novel $Eu^{2+}$-activated silicate green-emitting phosphors of an embodiment in the present invention is greatly decreased compared with the $Ca_{1.98}MgSi_2O_7:Eu_{0.02}$ which is the phosphor having the base composition. At this time, it is also understood that the change in the y value of the chromaticity (x, y) is not large.

Therefore, it can be confirmed that the emitted light color is highly color-purified as a green color in the $[(Ca_{0.9}Ba_{0.1})_{1.98}MgSi_2O_7:Eu_{0.02}$ and $(Ca_{0.9}Sr_{0.1})_{1.98}MgSi_2O_7:Eu_{0.02}]$ which are the novel $Eu^{2+}$-activated silicate green-emitting phosphors of an embodiment in the present invention compared with the phosphor having the base composition phosphor, $Ca_{1.98}MgSi_2O_7:Eu_{0.02}$, which has a yellowish emission color upon the excitation of the wavelength of 172 nm.

Moreover, the intensity of the maximum of the emission band of the novel $Eu^{2+}$-activated silicate green-emitting phosphor, $(Ca_{0.9}Sr_{0.1})_{1.98}MgSi_2O_7:Eu_{0.02}$, is larger than the intensity of the maximum of the emission band of the base composition phosphor, $Ca_{1.98}MgSi_2O_7:Eu_{0.02}$. Therefore, it can be seen that the emission efficiency is improved. In addition, with regard to the luminance characteristics, it is understood that the luminance of the novel $Eu^{2+}$-activated silicate green-emitting phosphor, $(Ca_{0.9}Sr_{0.1})_{1.98}MgSi_2O_7:Eu_{0.02}$, is 1.2 times as large as the base composition phosphor, $Ca_{1.98}MgSi_2O_7:Eu_{0.02}$.

Therefore, the novel $Eu^{2+}$-activated silicate green-emitting phosphor of an embodiment in the present invention, where a part of the Ca of the host composition of the base phosphor substitutes for Sr or Ba is preferable for a green-emitting phosphor for a PDP. Concerning the luminance characteristics, it is understood that the novel $Eu^{2+}$-activated silicate green-emitting phosphor in which a part of the Ca of the host component of the base phosphor substitutes for Sr is more preferable as a green-emitting phosphor for a PDP.

Next, emission spectra were measured in the same manner by using a vacuum ultraviolet light excimer lamp with a 146 nm central emission wavelength, and the evaluation of the emission color characteristics and other emission characteristics was carried out. As a result, the entire the emission spectra of the novel $Eu^{2+}$-activated silicate green-emitting phosphor in an embodiment of the present invention are also shifted to the lower wavelength side compared with the $Ca_{1.98}MgSi_2O_7:Eu_{0.02}$ which is the phosphor having the base composition (refer to the column of the wavelength of the maximum of the emission band in FIG. 2 to be described later).

And, for the chromaticity (x, y) on the CIE XYZ calorimetric scale which represents the emission color of the phosphor, the x value and y value therein are the chromaticity (x, y)=(0.36, 0.58), respectively, in the $Ca_{1.98}MgSi_2O_7:Eu_{0.02}$ which is the phosphor having the base composition. On the other hand, the chromaticity of the novel $Eu^{2+}$-activated silicate green-emitting phosphors, $(Ca_{0.9}Ba_{0.1})_{1.98}MgSi_2O_7:Eu_{0.02}$, has a chromaticity (x, y)=(0.28, 0.42) and the chromaticity (x, y) of the novel $Eu^{2+}$-activated silicate green-emitting phosphors, $(Ca_{0.1}Sr_{0.1})_{1.98}MgSi_2O_7:Eu_{0.02}$, is (x, y)=(0.32, 0.58).

Specifically, it is understood that the x value of the chromaticity (x, y) of the $[(Ca_{0.9}Ba_{0.1})_{1.98}MgSi_2O_7:Eu_{0.02}$ and $(Ca_{0.9}Sr_{0.1})_{1.98}MgSi_2O_7:Eu_{0.02}]$ which are the novel $Eu^{2+}$-activated silicate green-emitting phosphors of the embodiment in the present invention is clearly decreased compared with the $Ca_{1.98}MgSi_2O_7:Eu_{0.02}$ which is the phosphor having the base composition.

At this time, in the novel $Eu^{2+}$-activated silicate green-emitting phosphor, $(Ca_{0.9}Ba_{0.1})_{1.98}MgSi_2O_7:Eu_{0.02}$, the x value of the chromaticity (x, y) greatly decreased compared with the $Ca_{1.98}MgSi_2O_7:Eu_{0.02}$ which is the phosphor having the base composition, and the y value is also decreased. On the other hand, in the novel $Eu^{2+}$-activated silicate green-emitting phosphor, $(Ca_{0.9}Sr_{0.1})_{1.98}MgSi_2O_7:Eu_{0.02}$, it is understood that the y value thereof does not decrease so-much compared with the $Ca_{1.98}MgSi_2O_7:Eu_{0.02}$ which is the phosphor having the base composition.

Therefore, in the $[(Ca_{0.9}Ba_{0.1})_{1.98}MgSi_2O_7:Eu_{0.02}$ and $(Ca_{0.9}Sr_{0.1})_{1.98}MgSi_2O_7:Eu_{0.02}]$ which are the novel $Eu^{2+}$-activated silicate green-emitting phosphors of an embodiment in the present invention, it can be confirmed that the emitted light color is highly color-purified as a green color upon the excitation of the wavelength of 146 nm compared with the phosphor having the base composition phosphor, $Ca_{1.98}MgSi_2O_7$:$Eu_{0.02}$ and, specifically, that the high color-purification can be achieved in the novel $Eu^{2+}$-activated silicate green-emitting phosphor, $(Ca_{0.9}Sr_{0.1})_{1.98}MgSi_2O_7$:$Eu_{0.02}$.

Moreover, the intensity of the maximum of the emission band of the novel $Eu^{2+}$-activated silicate green-emitting phosphor, $(Ca_{0.9}Sr_{0.1})_{1.98}MgSi_2O_7$:$Eu_{0.02}$, is larger than the intensity of the maximum of the emission band of the base composition phosphor, $Ca_{1.98}MgSi_2O_7$:$Eu_{0.02}$. Therefore, it can be seen that the emission efficiency is improved. In addition, with regard to the luminance characteristics, it is understood that the luminance of the novel $Eu^{2+}$-activated silicate green-emitting phosphor, $(Ca_{0.9}Sr_{0.1})_{1.98}MgSi_2O_7$:$Eu_{0.02}$, is 1.2 times as large as that of the base composition phosphor, $Ca_{1.98}MgSi_2O_7$:$Eu_{0.02}$.

Therefore, the novel $Eu^{2+}$-activated silicate green-emitting phosphor of an embodiment in the present invention, where a part of the Ca of the host composition of the base phosphor substitutes for Sr or Ba is preferable for a green-emitting phosphor for a PDP upon excitation by light at a wavelength of 146 nm.

According to the evaluation results upon excitation by light at a wavelength of 146 nm, concerning the improvement of color characteristics and the luminance characteristics, it is understood that the novel $Eu^{2+}$-activated silicate green-emitting phosphor in which a part of the Ca of the host component of the base phosphor substitutes for Sr is further preferable as a green-emitting phosphor for a PDP.

FIG. 2 shows a summary of the analysis results and the evaluation results of the emission characteristics of the novel $Eu^{2+}$-activated silicate green-emitting phosphor of an embodiment in the present invention and of the base composition phosphor, $Ca_{1.98}MgSi_2O_7$:$Eu_{0.02}$. FIG. 2 is an explanatory table summarizing the analysis data of the emission characteristics and emission spectra of the $[(Ca_{0.9}Ba_{0.1})_{1.98}MgSi_2O_7$:$Eu_{0.02}$ and $(Ca_{0.9}Sr_{0.1})_{1.98}MgSi_2O_7$:$Eu_{0.02}]$ which are the novel $Eu^{2+}$-activated silicate green-emitting phosphors of an embodiment in the present invention and of the $Ca_{1.98}MgSi_2O_7$:$Eu_{0.02}$ which is a phosphor having the base composition.

Next, the aforementioned evaluation results will be discussed in detail. Concretely, the inventors focus on the differences between the emission characteristics upon excitation by light at a wavelength of 172 nm in a vacuum ultraviolet light region and the emission characteristics upon excitation by light at a wavelength of 146 nm and discuss them for $[(Ca_{0.9}Ba_{0.1})_{1.98}MgSi_2O_7$:$Eu_{0.02}$ and $(Ca_{0.9}Sr_{0.1})_{1.98}MgSi_2O_7$:$Eu_{0.02}]$ which are the novel $Eu^{2+}$-activated silicate green-emitting phosphors of an embodiment in the present invention.

From the results of the discussion, it is confirmed that the amount of the shift of each emission spectrum to the lower wavelength side depends on the wavelength in a vacuum ultraviolet light region which excites the phosphor, and it is confirmed that the amount of shift toward the lower wavelength side was larger in the case of excitation by vacuum ultraviolet light at a wavelength of 172 nm than in the case of excitation by vacuum ultraviolet light at a wavelength of 146 nm.

Concretely, the wavelength of the maximum of the emission band of the $Eu^{2+}$-activated silicate phosphor $Ca_{1.98}MgSi_2O_7$:$Eu_{0.02}$ which is a base is 536 nm upon excitation by vacuum ultraviolet light at a wavelength of 146 nm and the wavelength of the maximum of the emission band of the novel $Eu^{2+}$-activated silicate phosphor $(Ca_{0.9}Sr_{0.1})_{1.98}MgSi_2O_7$:$Eu_{0.02}$ is 532 nm, which is shifted 4 nm to the lower wavelength side. On the other hand, the wavelength of the maximum of the emission band of the $Eu^{2+}$-activated silicate phosphor $Ca_{1.98}MgSi_2O_7$:$Eu_{0.02}$ which is a base is 536 nm upon excitation by vacuum ultraviolet light at a wavelength of 172 nm and the wavelength of the maximum of the emission band of the novel $Eu^{2+}$-activated silicate phosphor $(Ca_{0.9}Sr_{0.1})_{1.98}MgSi_2O_7$:$Eu_{0.02}$ is 528 nm under the same conditions, which is a rather large shift of 8 nm to the lower wavelength side.

At this time, the wavelength of the maximum of the emission band of the $Mn^{2+}$-activated zinc silicate phosphor, $Zn_2SiO_4$:Mn, is 528 nm upon excitation by vacuum ultraviolet light at a wavelength of 172 nm and evaluated in the same manner, so that it is understood that the $Eu^{2+}$-activated silicate phosphor has achieved a similar level, specifically, in the $(Ca_{0.9}Sr_{0.1})_{1.98}MgSi_2O_7$:$Eu_{0.02}$ which is an example where a part of the Ca of the host composition of the base phosphor substitutes for Sr.

As a result, in the novel $Eu^{2+}$-activated silicate green-emitting phosphors of the embodiment in the present invention, specifically, in the $(Ca_{0.9}Sr_{0.1})_{1.98}MgSi_2O_7$:$Eu_{0.02}$ which is an example where a part of the Ca of the host composition of the base phosphor substitutes for Sr, it is understood that a shift of the emission spectra to the lower wavelength side is greater upon excitation by vacuum ultraviolet light at a wavelength of 172 nm compared to excitation by vacuum ultraviolet light at a wavelength of 146 nm, that is, high color-purification is possible.

Moreover, the y value of the chromaticity (x, y) of the emission color in the novel $Eu^{2+}$-activated silicate green-emitting phosphors, $(Ca_{0.9}Sr_{0.1})_{1.98}MgSi_2O_7$:$Eu_{0.02}$, is y value=0.59 upon excitation by light at a wavelength of 172 nm and y value=0.58 upon excitation by light at a wavelength of 146 nm. Therefore, in the novel $Eu^{2+}$-activated silicate green-emitting phosphors of the embodiment in the present invention, specifically, in the $(Ca_{0.9}Sr_{0.1})_{1.98}MgSi_2O_7$:$Eu_{0.02}$ which is an example where a part of the Ca of the host composition of the base phosphor substitutes for Sr, the y value of the emission light color is greater upon excitation by vacuum ultraviolet light at a wavelength of 172 nm compared to excitation by vacuum ultraviolet light at a wavelength of 146 nm, that is, excellent color characteristics and expansion of the color specification region becomes possible.

The inventors consider that the aforementioned results are generated because of the $Eu^{2+}$-activated silicate phosphor, $Ca_2MgSi_2O_7$:$Eu^{2+}$, which is used as a base, and a part of the Ca elements which is a component of the host lattice substitutes for Sr or Ba having a larger ionic radius than Ca. Specifically, the situation, where larger ions substitute for the ions with the expected size, which are expected to be originally located in the host crystal of the phosphor, is created at a part of the host crystal, resulting in new distortion being created in the host crystal of the phosphor. As a result, the inventors consider that the new distortion in the host crystal influences the $Eu^{2+}$ which is the luminescence center, thereby, the emission characteristics of the phosphor are affected, and improvement in the emission efficiency of the $(Ca_{0.9}Sr_{0.1})_{1.98}MgSi_2O_7$:$Eu_{0.02}$ and a shift of the whole emission spectra to the lower wavelength side in the $(Ca_{0.9}Ba_{0.1})_{198}MgSi_2O_7$:$Eu_{0.02}$ and $(Ca_{0.9}Sr_{0.1})_{1.98}MgSi_2O_7$:$Eu_{0.02}$ are brought about.

And, the inventors also consider that the amount of new distortion created in the host crystal of the phosphor is appropriate, resulting in an improvement of the emission efficiency and the preferable green emission being brought about.

Therefore, it is understood that, for the $Eu^{2+}$-activated silicate phosphor, $Ca_2MgSi_2O_7$:$Eu^{2+}$, the method in which Ca elements of the host lattice component substitute for at least one selected from the group consisting of Sr and Ba is preferable as a method for shifting the emission spectra to the lower wavelength side upon excitation by, in particular, vacuum ultraviolet light.

Moreover as mentioned above, the method in which Ca elements of the host lattice components substitute for at least one selected from the group consisting of Sr and Ba has a purpose for creating an appropriate distortion in the host crystal, and it is considered that only a part of the Ca elements substitute for at least one selected from Sr and Ba. When the amount of substituted elements selected, from at least one selected from the group consisting of Ba and Sr, becomes too large with respect to the amount of Ca elements, there is a fear that the created effect of distortion becomes weak. Moreover, for instance, when Ca elements substitute for Sr elements, the amount of substituted Sr elements becomes greater than half the amount of the original Ca component content, and the Sr component content in the obtained phosphor becomes greater than the Ca content, then it is assumed that the phosphor may not maintain the characteristics of the $Ca_2MgSi_2O_7:Eu^{2+}$ any longer.

Therefore, in order to maintain the characteristics of $Ca_2MgSi_2O_7:Eu^{2+}$ and to achieve the preferable green-emission, the amount of substitution of at least one selected from Sr and Ba to the Ca component is expressed as x, the mole fraction of M1 component, and it is considered that x<0.7 is preferable.

The phosphor shown in the aforementioned general formula (1) in which the M2 component thereof is Mg has been explained as an embodiment of the present invention. Herein, it is possible that one or more elements selected from the group consisting of Mg and Zn is used for the M2 component and, for instance, it is possible that only Zn is used for the M2 component or a component may contain both elements of Mg and Zn. The Zn component has a different ionic radius than the Mg component, so that the effect of forming a crystal structure different from the phosphor containing Mg as the component is expected when the Zn element is present in the phosphor as the component. As a result, the emission characteristics, in particular, the luminance and the emission color characteristics from the phosphor containing Zn component can be controlled, thereby a phosphor having desirable emission characteristics for a PDP becomes obtainable Moreover, with regard to the lower limit of the amount of substitution of at least one selected from Sr and Ba relative to the Ca component, it is considered that it should be provided that the content of Ca which is not intended, that is, the case of containing Ca in the phosphor as an impurity, is distinguished from the case of Ca contained for the purpose of improving the emission performance.

Therefore, in the $Eu^{2+}$-activated silicate green-emitting phosphor of an embodiment in the present invention, the lower limit of the Ca component content is set afresh in consideration of the following conditions. It is thought that the amount where the target component element such as Sr and Ba can be contained as an impurity is on the order of several ppm to several tens of ppm (from several milligrams to several tens of milligrams in 1000 grams) at the maximum even in the case using a high purity synthetic material of, for instance, 99.9% or higher. Moreover, the amount of Ca content substantially controllable is about 0.1 mg (10 ppm) when synthesizing a small amount of phosphor of about 10 g in a so-called laboratory demonstration, and furthermore, there is not so large a difference in the molecular weight, which is nearly double at the maximum, between Sr and Ba compounds and a correspondingly similar Mg compound.

Accordingly, for the $Eu^{2+}$-activated silicate green-emitting phosphor of an embodiment in the present invention, with the assumption that the content of Sr or Ba is about 100 ppm or more and, according to the expression of the aforementioned general formula (1), the lower limit x which expresses the composition of at least one selected from Sr and Ba of the phosphor component can be set at x=0.0001.

Further, with the clear distinction with the unintentional inclusion and in consideration of the fact that it may be eliminated even in the case of using a phosphor material with low purity, for realizing a clear distinction, it is preferable that the lower limit of the content of at least one selected from Sr and Ba be controlled to be about 10 times as large as the above value so that, according to the expression of the aforementioned general formula (1), the lower limit x which expresses the composition of at least one selected from Sr and Ba is controlled to be x=0.0001.

Furthermore, in consideration of the amount included unintentionally in the case of using a phosphor material with lower purity, for realizing a clear distinction, it is preferable that the lower limit of the content of at least one selected from Sr and Ba be about 100 times as large as the above value so that according to the expression of the aforementioned general formula (1), the lower limit x which expresses the composition of at least one selected from Sr and Ba is x=0.01.

Moreover, according to the composition of the activator, Eu, in the novel $Eu^{2+}$-activated silicate green-emitting phosphor of the embodiment in the present invention, the lower limit is set at the amount where the effect as the luminescence center is sufficiently carried out, and the upper limit is set at the amount where the decrease in the emission efficiency caused by concentration quenching can be avoided. Specifically, according to the expression of the aforementioned general formula (1), the e representing the Eu composition is preferably $0.001 \leq e \leq 0.2$.

Next, the relationship between the effect of the high Xe technology in a PDP and the present invention will be described. As described above, as in the PDP, it is known that the more the mole fraction of Xe in the discharge gas is increased, the more the entire amount of vacuum ultraviolet light to be generated is increased, and the more the intensity ratio of the emission band ($I_{172}/I_{146}$) of the wavelength ultraviolet light component 146 nm to that of 172 nm ($Xe_2$ molecular line) is increased.

Figure 3:
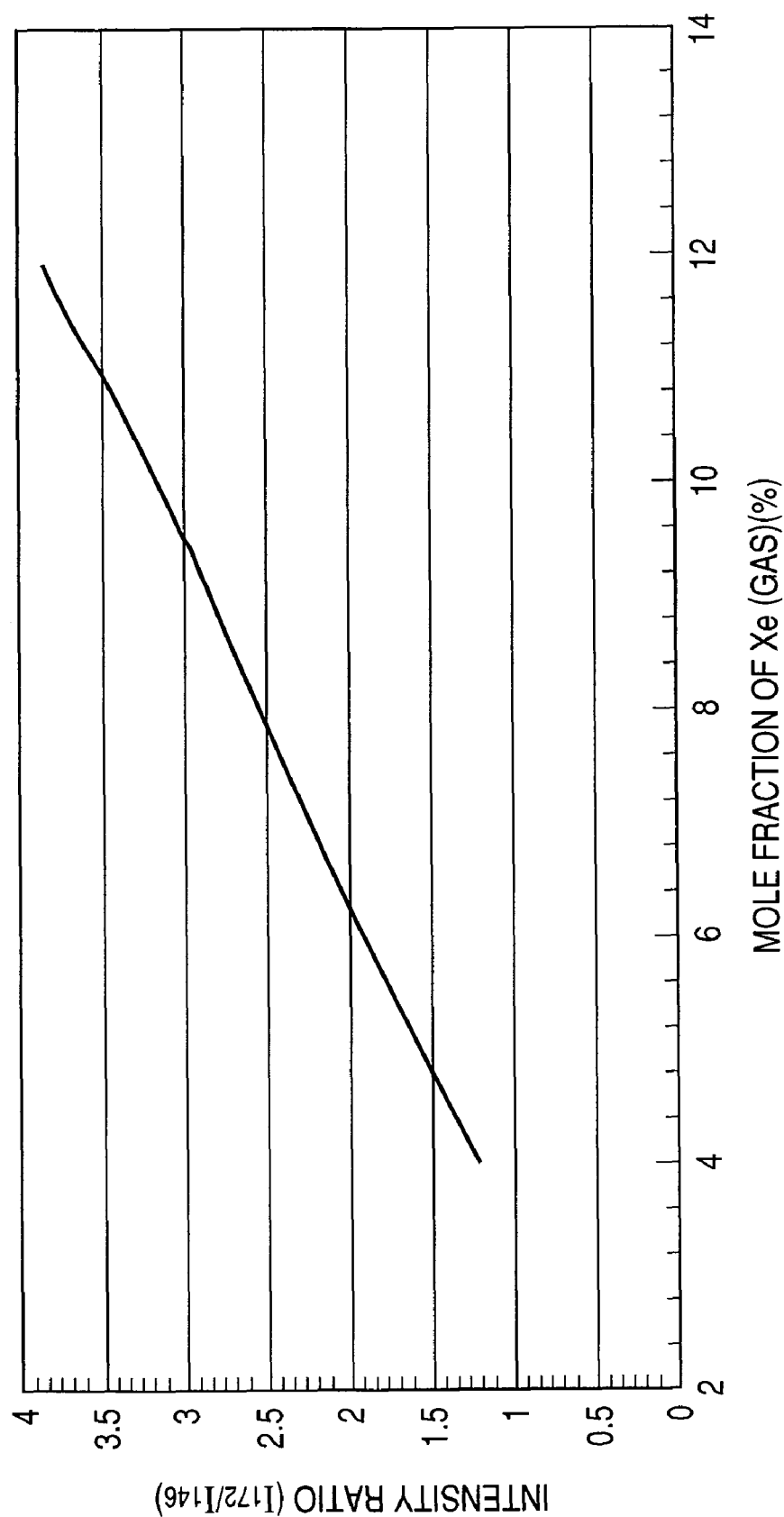
FIG. 3 is a graph showing the relationship between the mole fraction (%) of Xe in the discharge gas in an AC PDP and the intensity ratio ($I_{172}/I_{146}$)

FIG. 3 is a graph showing the relationship between the mole fraction (%) of Xe in the discharge gas in an AC PDP and the intensity ratio ($I_{172}/I_{146}$).

As a result of the investigations, according to the AC PDP, when the mole fraction of Xe is 4%, the intensity ratio is $I_{172}/I_{146}$ (4%)=1.2. According to conventional PDPs having a mole fraction of Xe of 1 to 4%, with respect to the intensity ratio of the ultraviolet light component at 146 nm and the ultraviolet light component at 172 nm included in the vacuum ultraviolet light generated by the discharge, the intensity of the 172 nm component is somewhat larger or equal or rather smaller than that of the 146 nm component.

Moreover, as a result of further investigations, with the mole fraction of Xe of 6%, as the entire intensity of vacuum ultraviolet light to be generated by discharge is increased, the ratio of $I_{172}$ to $I_{146}$ becomes drastically larger, i.e., $I_{172}/I_{146}$ (6%)=1.9. And, at a mole fraction of Xe of 10%, as the intensity of vacuum ultraviolet light to be generated by discharge is further increased, the ratio of $I_{172}$ to $I_{146}$ becomes drastically larger, i.e., $I_{172}/I_{146}$ (6%)=3.1. Moreover, with a mole fraction of Xe of 12%, it was found out that as the intensity of vacuum ultraviolet light to be generated by discharge is increased more, the ratio of $I_{172}$ to $I_{146}$ becomes extremely larger, i.e., $I_{172}/I_{146}$ (6%)=3.8.

Therefore, according to the high-Xe content PDP designs having a mole fraction of Xe of, for instance, 6% which is larger than the PDP with the ordinary specification of the mole fraction of Xe in the discharge gas, the contribution of the characteristics of the phosphor to be used in the 172 nm vacuum ultraviolet light becomes larger. Therefore, it is preferable to use a phosphor which achieves light emission with higher characteristics such as high luminance with respect to the 172 nm wavelength ultraviolet light.

Furthermore, when setting the mole fraction of Xe even higher, i.e., 10% or more, to achieve light emission with even higher efficiency, demand for the performance of phosphors to obtain light emission with respect to the 172 nm wavelength ultraviolet light becomes even higher. Moreover, when setting the mole fraction of Xe even higher, i.e., 12% or more, to achieve light emission with higher efficiency, since the intensity ratio is $I_{172}/I_{146}$ (12%)=3.8, which is extremely high, the demand for the performance of the phosphor to obtain light emission with much better characteristics such as higher brightness with respect to the 172 nm wavelength ultraviolet light is becomes even higher.

As described above, when the novel $Eu^{2+}$-activated silicate green-emitting phosphor of the present invention represented by the aforementioned general formula (1) is used for a PDP using a discharge gas containing a Xe composition, since excellent emission characteristics can be obtained in the phosphor as a result of excitation by vacuum ultraviolet light at a wavelength of 172 nm as well as that of 146 nm, the $Xe_2$ molecular line which is generated can also be utilized effectively so that a high performance PDP can be provided.

Moreover, the $Eu^{2+}$-activated silicate green-emitting phosphor of the present invention represented by the aforementioned general formula (1) is preferably suited for the so-called "high Xe-PDP design" technology of using a discharge gas containing Xe gas, for instance, in a mole fraction of Xe=6% or more, more preferably 10% or more with a large intensity ratio of the ultraviolet light component at 172 nm to the ultraviolet light component at 146 nm ($Xe_2$ molecular line is utilized actively), and further preferably, a mole fraction of Xe=12% or more with a $I_{172}/I_{146}$ (12%)=3.8, which is remarkably large. Thereby, a high performance PDP using a discharge gas with a high Xe technology can be realized.

Consequently, according to the novel $Eu^{2+}$-activated silicate green-emitting phosphor of the present invention represented by the aforementioned general formula (1), the improvement of color characteristics, specifically, color purification can be observed in the phosphor $Ca_{1.98}MgSi_2O_7$:$Eu_{0.02}$ having the base composition and, as noticeably seen in the $(Ca_{0.9}Sr_{0.1})_{1.98}MgSi_2O_7$:$Eu_{0.02}$ which is an example of the case of substituting a part of the Ca of the host composition with Sr, more preferable improvement effects can be obtained upon excitation by ultraviolet light at a wavelength of 172 nm than with excitation by ultraviolet light at a wavelength of 146 nm.

Therefore, upon excitation by ultraviolet light essentially at a wavelength of 172 nm, in terms of an improvement in the color characteristics, or the like, more significant effects and remarkable characteristics can be realized.

Therefore, when the novel $Eu^{2+}$-activated silicate green-emitting phosphor of the present invention represented by the aforementioned general formula (1) is used for a PDP using a discharge gas containing a Xe composition which has a mole fraction of 6% or more, more preferably 10% or more, and further preferably 12% or more, since excellent emission characteristics can be shown, effectively utilizing the $Xe_2$ molecular line generated in the PDP, a high performance PDP can be provided so that a high performance plasma display device can be provided as well.

Based on the forgoing description, an embodiment of the PDP using the $Eu^{2+}$-activated silicate green-emitting phosphor represented by the aforementioned general formula (1) is configured as follows.

Figure 4:
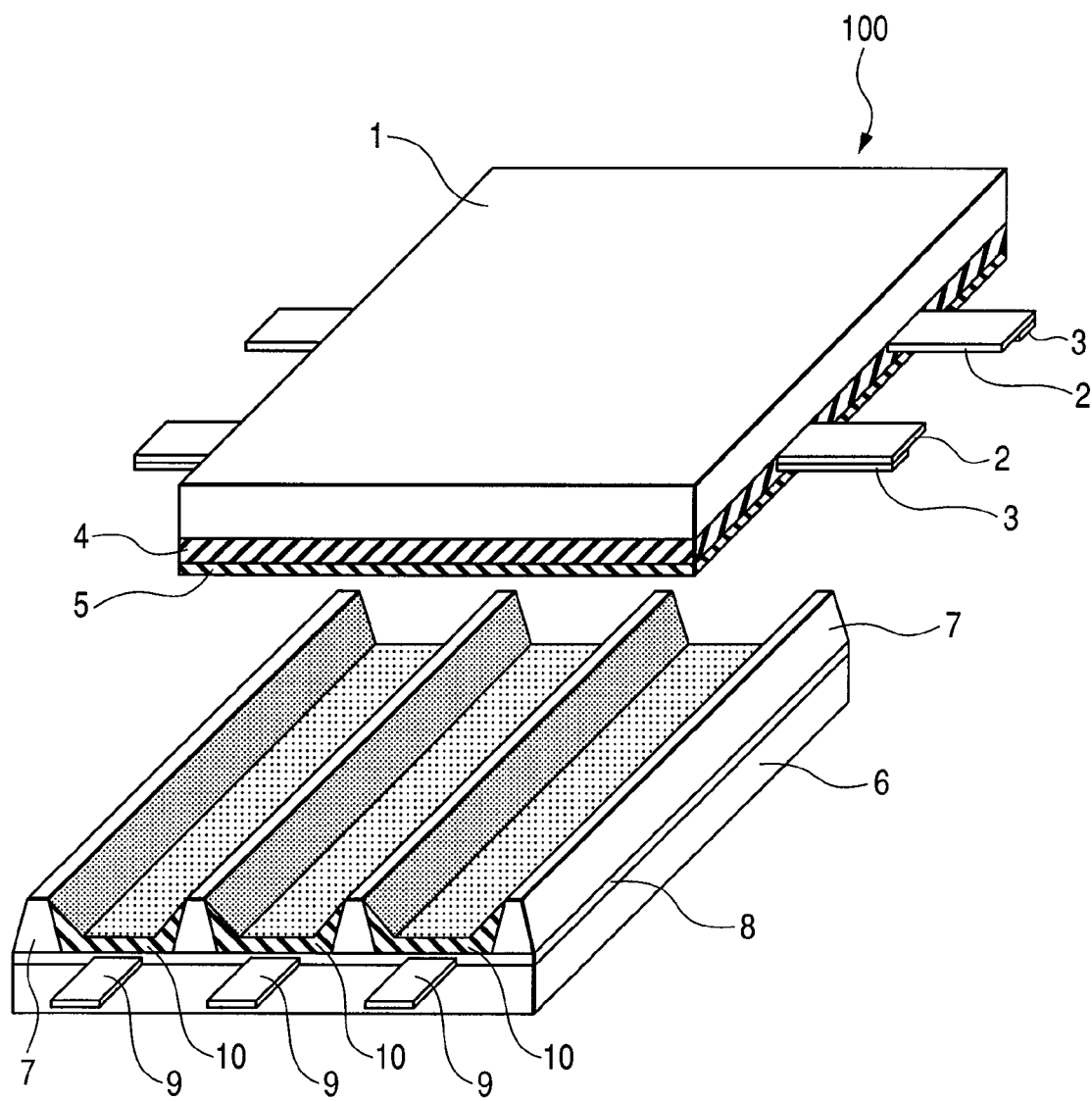
FIG. 4 is an exploded perspective view of the main parts showing an example of a configuration of a plasma display panel constituting a PDP device of an embodiment of the present invention.
Figure 5:
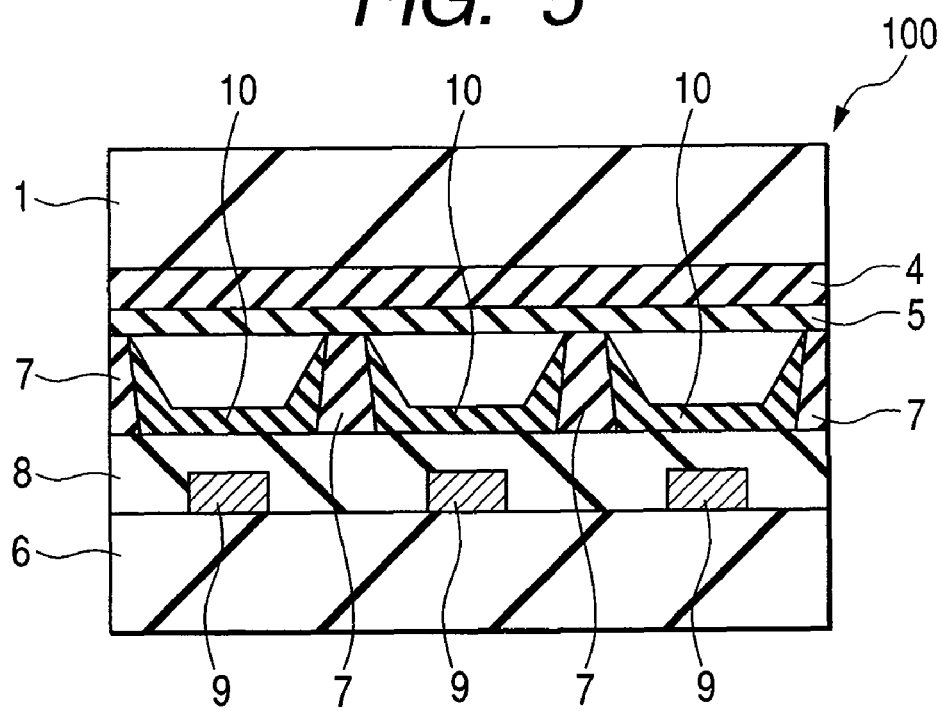
FIG. 5 is an exploded cross-sectional view of the main parts showing an example of a configuration of a plasma display panel constituting a PDP device of an embodiment of the present invention.
Figure 6:
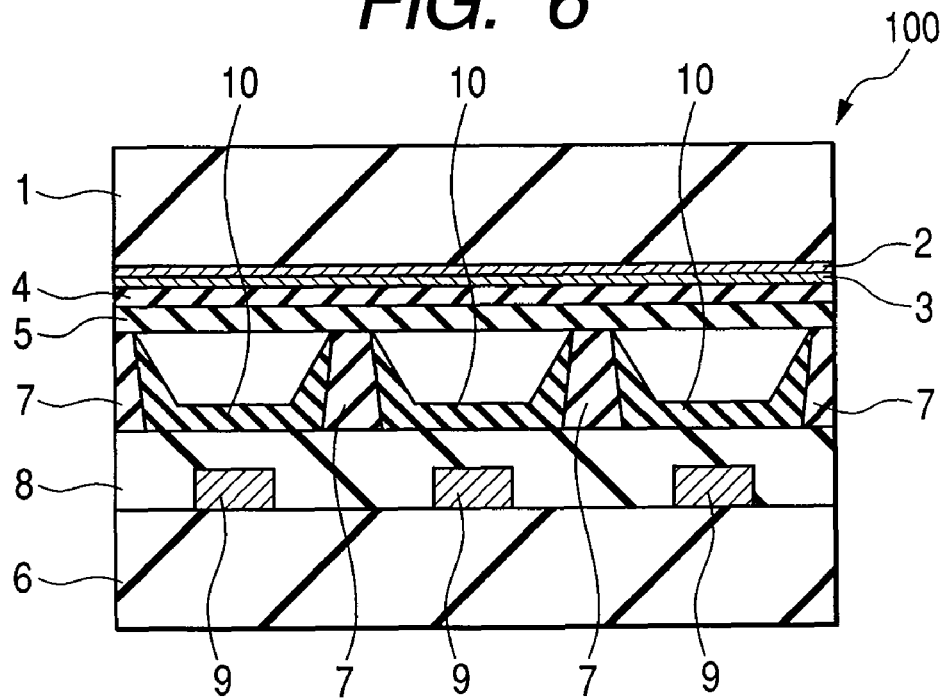
FIG. 6 is an exploded cross-sectional view of the main parts showing an example of a configuration of a plasma display panel constituting a PDP device of an embodiment of the present invention.
Figure 7:
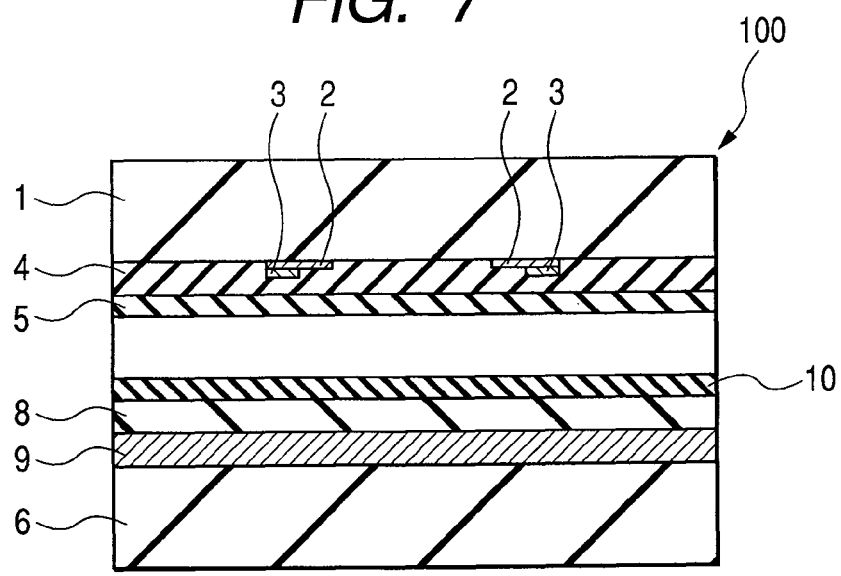
FIG. 7 is an exploded cross-sectional view of the main parts showing an example of a configuration of a plasma display panel constituting a PDP device of an embodiment of the present invention.

FIG. 4 is an exploded perspective view of the main parts showing an example of the configuration of the main parts of a PDP of the embodiment in the present invention. FIG. 5, FIG. 6, and FIG. 7 are cross-sectional views of the main parts showing an example of a configuration of the main parts of a PDP of an embodiment in the present invention.

The PDP 100 as an embodiment of the present invention has a so-called surface discharge AC-PDP structure corresponding to surface discharge. It comprises a pair of substrates 1, 6 arranged at a distance so as to face each other; barrier ribs 7 arranged on a facing side of the substrate 6 for keeping the distance between the substrates 1, 6 when they are superimposed and forming a space between the substrates 1 and 6; electrodes 2, 9 arranged on the facing sides of the substrate 1 and 6; and a discharge gas (not shown) sealed in the space formed between the substrates 1 and 6 for generating ultraviolet light as a result of electric discharge upon application of a voltage to the electrode 2 or the electrodes 2 and 9. FIG. 5 shows a cross-section along the direction of electrode 2; FIG. 6 shows another cross-section along the direction of electrode 2; and FIG. 7 is a cross-section along the direction of electrode 9.

And, a phosphor layer 10 containing the $Eu^{2+}$-activated silicate phosphor represented by the aforementioned general formula (1) is formed on one of the facing sides of the pair of substrates 1, 6 (substrate 6 side) and on the wall surface of the barrier rib 7. The phosphor layer 10 normally includes phosphors corresponding to the light emission of three colors including red, blue, and green, i.e., a red-emitting phosphor, a blue-emitting phosphor, or a green-emitting phosphor such that the $Eu^{2+}$-activated silicate phosphor represented by the aforementioned general formula (1) for providing the green color in the phosphor layer 10 and the phosphors for providing the other colors (red and blue) are excited by vacuum ultraviolet of 146 nm and 172 nm wavelengths generated from the discharge gas by the electric discharge for emitting visible light.

Note that, a line indicated by the reference number 3 shown in FIG. 4, etc. is a bus-line made of Ag or Cu—Cr provided integrally with the electrode 2 for lowering the electrode resistance, the layers indicated by the reference numbers 4, 8 are dielectric layers, and a layer indicated by the reference number 5 is a protective film provided for protecting the electrode.

As a result, according to the novel $Eu^{2+}$-activated silicate green-emitting phosphors of an embodiment in the present invention represented by the general formula (1), specifically, to the $(Ca_{0.9}Sr_{0.1})_{1.98}MgSi_2O_7$:$Eu_{0.02}$ which is an example where a part of the Ca of the host composition of the base phosphor, $Ca_{1.98}MgSi_2O_7$:$Eu_{0.02}$, is substituted by Sr, it is understood that a shift of the emission spectra to the lower wavelength side is greater upon excitation by vacuum ultraviolet light at a wavelength of 172 nm compared to excitation by vacuum ultraviolet light at a wavelength of 146 nm, that is, a high color-purification becomes possible.

Based on the result, in consideration of the application to a high Xe-PDP including phosphors mainly upon excitation by vacuum ultraviolet light at a wavelength of 172 nm as mentioned above, it was assumed that detailed investigations of phosphor synthesis including the novel composition was carried out in order to obtain higher emission performance as used for a PDP.

Specifically, the inventors focused on a $Eu^{2+}$-activated silicate green-emitting phosphor represented by the aforementioned general formula (1) and the M1 component in the general formula (1) being Sr. Concretely, a $Eu^{2+}$-activated silicate green-emitting phosphor represented by the aforementioned general formula (2) was newly developed and evaluated.

As a result, the inventors succeeded in controlling the emission color characteristics, which are the emission characteristics of the phosphor under investigation, upon excitation by vacuum ultraviolet light at a wavelength of 172 nm; specifically, shifting the emission spectra upon excitation by vacuum ultraviolet light at a wavelength of 172 nm within a certain wavelength range; and making it controllable. As a result, it was discovered that the emission color upon excitation by vacuum ultraviolet light at a wavelength of 172 nm could be adjusted and controlled so as to be the more preferable green. Hereinafter, investigations, discussions, and application to a PDP will be explained in detail.

$$(Ca_{1-x}Sr_x)_{2-e}.M3.Si_2O_7:Eu_e \qquad (2)$$

In the general formula (2), M3 is at least one element selected from the group containing Mg and Zn; and x indicates the mole fraction of the component Sr and e indicates the mole fraction of Eu respectively satisfy the following conditions: $0<x<1$ and $0.001 \leq e \leq 0.2$.

The inventors used a $Eu^{2+}$-activated silicate phosphor $Ca_2MgSi_2O_7:Eu^{2+}$ as a base of the phosphor in which the component M3 in the general formula (2) is Mg and a newly synthesized phosphor where the composition thereof changes systematically by substituting a part of or all of the Ca component in the host lattice component by a Sr component. As a result, we invented a plurality of $Eu^{2+}$-activated silicate phosphors as examples of the aforementioned general formula (2) having different mole fractions of Sr component which systematically changes therein. Then, using these, comparative evaluations of the emission characteristics, specifically, the color characteristics were carried out upon excitation by vacuum ultraviolet light at a wavelength of 172 nm.

In the aforementioned Philips Res. Repts. 23, p 189~200 (1968) written by G. Blasse, W. L. Wanmaker, J. W. ter Vrugt and A. Bril (non-patent document 2), the results of an investigation were reviewed where $Sr_2MgSi_2O_7:Eu^{2+}$, $Ba_2MgSi_2O_7:Eu^{2+}$, and $(Sr_{0.5}Ba_{1.5})_2MgSi_2O_7:Eu^{2+}$, etc. are excited by ultraviolet light at a wavelength of 254 nm and the emission spectrum evaluation and other evaluations are carried out. In the aforementioned three examples of phosphors, it is reported that 0.02 moles of activator $Eu^{2+}$ are contained in the phosphors.

According to the aforementioned document, it is reported that the wavelength of the maximum of the emission band is 470 nm in the emission spectrum of the $Sr_2MgSi_2O_7:Eu^{2+}$ upon excitation by light at a wavelength of 254 nm and that the wavelength of the maximum of the emission band is 500 nm in the $Ba_2MgSi_2O_7:Eu^{2+}$ upon the same conditions, which appears on the longer wavelength side. In the $(Sr_{0.5}Ba_{1.5})_2MgSi_2O_7:Eu^{2+}$ where a part of the Ba in the host lattice component of the $Ba_2MgSi_2O_7:Eu^{2+}$ is substituted by Sr, the maximum of the emission band is 440 nm in the emission spectrum upon excitation by light at a wavelength of 254 nm, and the entire emission spectra thereof appear to a great extent on the lower wavelength side than either of $Sr_2MgSi_2O_7:Eu$ or $Ba_2MgSi_2O_7:Eu^{2+}$.

In the case of $(Sr_{0.5}Ba_{1.5})_2MgSi_2O_7:Eu^{2+}$ where a part of the host lattice in the $Sr_2MgSi_2O_7:Eu^{2+}$ is substituted by a Ba component, the obtained emission spectrum of the phosphor sample, that is, the emission spectrum representing the emission color characteristics, is greatly different from that of the $Sr_2MgSi_2O_7:Eu^{2+}$ which is a base upon excitation by light at a wavelength of 254 nm, and it appears on the lower wavelength side. Compared with the $Ba_2MgSi_2O_7:Eu^{2+}$ corresponding to substitution of all the Sr component in the $Sr_2MgSi_2O_7:Eu^{2+}$ by a Ba component and seen as the similar base composition, it is reported that the emission spectrum appears to a considerable extent on the lower wavelength side.

In the investigations of the present invention, the evaluations are investigated not upon excitation by light at a wavelength of 254 nm but upon excitation by light of a low wavelength such as a wavelength of 146 nm or 172 nm in the vacuum ultraviolet light region.

Therefore, in the present invention where the silicate phosphor $Ca_2MgSi_2O_7:Eu^{2+}$ containing $Eu^{2+}$ as an activator is used as a base; the composition thereof changes systematically by substituting a part of or all of the Ca component in the host lattice component by Sr component; and the emission characteristics are evaluated. It is difficult from the results of the aforementioned document to expect beforehand how different the emission characteristics will be, specifically, color characteristics of the target phosphor can be obtained from the base phosphors, $Ca_2MgSi_2O_7:Eu$ and $Sr_2MgSi_2O_7:Eu^{2+}$.

Therefore, it becomes important to pursue concretely the aforementioned detailed investigations in practice. As the results of various investigations, according to the $Eu^{2+}$-activated silicate green-emitting phosphor represented by the aforementioned general formula (2), it was found that the more the composition of Sr component is increased relative to the Ca component, and all of them are substituted by the Sr component, the more the emission color characteristics are changed. Therefore, a phosphor composition having appropriate emission color characteristics suitable for a PDP, in particular, a more suitable range of the Sr component composition in the phosphor of the aforementioned general formula (2) can be made clear. Hereinafter, investigations and discussions will be described in detail.

The inventors selected a phosphor having a composition to be a base. Concretely, $Ca_{1.97}MgSi_2O_7:Eu_{0.03}$ was selected as a phosphor of the base composition.

With regard to selection of the phosphor system containing a mole fraction of $Eu^{2+}$ of 0.03 in the aforementioned general formula (2), compared with the aforementioned $(Ca_{0.9}Sr_{0.1})_{1.98}MgSi_2O_7:Eu_{0.02}$ and the $(Ca_{0.9}Sr_{0.1})_{1.97}MgSi_2O_7:Eu_{0.03}$ explained as follows, both have the same value of chromaticity (x, y)=(0.33, 0.59) upon excitation by light at a wavelength of 172 nm. Therefore, in the phosphor system containing Sr component shown in the aforementioned general formula (2), it is understood that differences in the mole fraction of the contained activator, $Eu^{2+}$, does not exert a big influence on the emission color of the phosphor and it can be treated as equal.

Moreover, the luminance characteristics of the aforementioned $(Ca_{0.9}Sr_{0.1})_{1.98}MgSi_2O_7:Eu_{0.02}$ upon excitation by light at a wavelength of 172 nm is 1.2 times as high as that of the phosphor, $Ca_{1.98}MgSi_2O_7:Eu_{0.02}$ having the base composition. On the other hand, that of $(Ca_{0.9}Sr_{0.1})_{1.97}MgSi_2O_7:Eu_{0.03}$ is 1.16 times as high as that of $Ca_{1.97}MgSi_2O_7:Eu_{0.03}$ having the composition of the base, so that it is understood that an equal effect of the luminous improvement is shown for the base phosphor.

Moreover, the $Sr_{1.97}MgSi_2O_7:Eu_{0.03}$ corresponding to the phosphor where all the Ca component of the base phosphor, $Ca_{1.97}MgSi_2O_7:Eu_{0.03}$, is substituted by the Sr component is seen as a phosphor existing at another extreme from the phosphor having the base composition, $Ca_{1.97}MgSi_2O_7:Eu_{0.03}$, and it will be treated as a target for the comparative evaluation.

Synthesis is carried out for a $Eu^{2+}$-activated silicate green-emitting phosphor of an embodiment in the present invention and the following phosphors were obtained; $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$.

In order to make a comparison with $Ca_{1.97}MgSi_2O_7:Eu_{0.03}$ and $Sr_{1.97}MgSi_2O_7:Eu_{0.03}$ which are the $Eu^{2+}$-activated silicate phosphors having the base composition, measurement of the emission spectra and evaluation of emission color characteristics and relative brightness with reference to the brightness of $Ca_{1.97}MgSi_2O_7:Eu_{0.03}$ were carried out in the usual way by using a vacuum ultraviolet light excimer lamp having a central emission wavelength of 146 nm.

Figure 8:
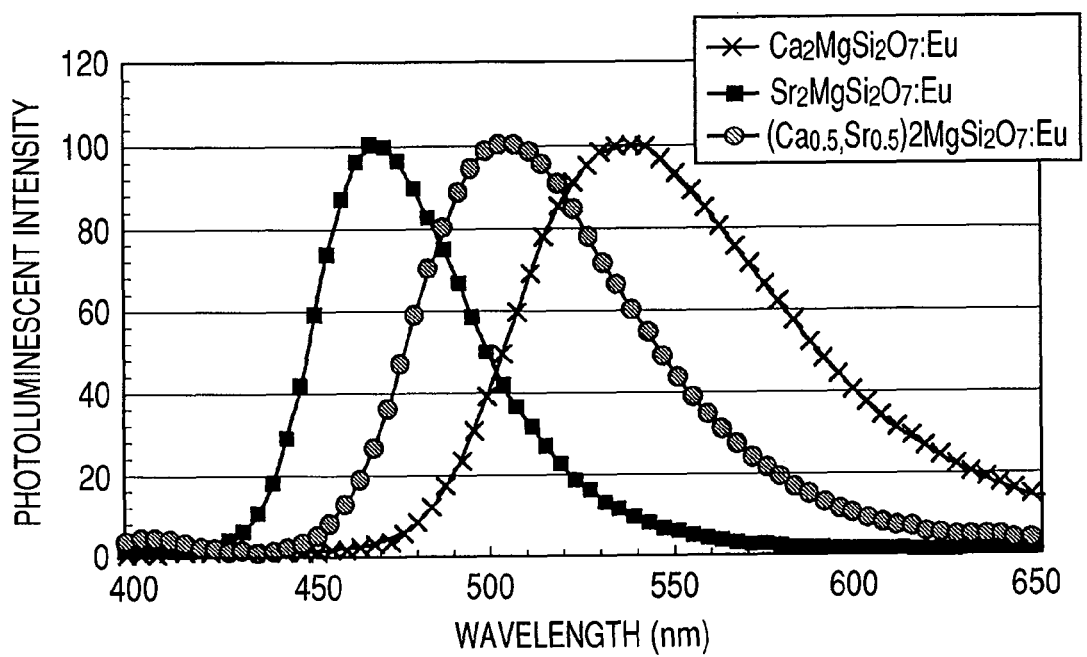
FIG. 8 is explanatory diagram illustrating emission spectra upon excitation by vacuum ultraviolet light at a wavelength of 172 nm as examples of the novel phosphor and a phosphor having a base composition constituting a PDP device of an embodiment of the present invention.

FIG. 8 shows emission spectra upon excitation by vacuum ultraviolet light at a wavelength of 172 nm of $(Ca_{0.5}Sr_{0.5})_{1.97}MgSi_2O_7:Eu_{0.03}$ as an example of the novel $Eu^{2+}$-activated silicate green-emitting phosphor in an embodiment of the present invention and $Ca_{1.978}MgSi_2O_7:Eu_{0.03}$ and $Sr_{1.978}MgSi_2O_7:Eu_{0.03}$ as $Eu^{2+}$-activated silicate phosphors having the base composition.

The emission characteristics of $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$ as the examples of the novel $Eu^{2+}$-activated silicate green-emitting phosphor in an embodiment of the present invention and $Ca_{1.97}MgSi_2O_7:Eu_{0.03}$ and $Sr_{1.97}MgSi_2O_7:Eu_{0.03}$ as $Eu^{2+}$-activated silicate phosphors having the base composition, concretely, the relative brightness with reference to $Ca_{1.97}MgSi_2O_7:Eu_{0.03}$ (the brightness of $Ca_{1.97}MgSi_2O_7:Eu_{0.03}$ is a reference value=100), the wavelength of the maximum of the emission band in the emission spectrum upon excitation by light at a wavelength of 172 nm, and the x value and y value in the chromaticity (x, y) in CIE XYZ calorimetric scale were evaluated. FIG. 9 is an explanatory table summarizing the evaluation results of the emission characteristics, upon excitation by light at a wavelength of 172 nm, of the $Eu^{2+}$-activated silicate green-emitting phosphors of an embodiment in the present invention and of a $Eu^{2+}$-activated silicate phosphor having the base composition.

In the explanatory table shown in FIG. 9, for instance, "0% Sr" in the line showing "mole fraction of Sr" means the mole fraction of Sr component contained in the phosphor relative to the Ca component expressed as a percent and, concretely, it means $Ca_{1.97}MgSi_2O_7:Eu_{0.03}$ in the aforementioned phosphors. Similarly, the description of "100% Sr" means $Sr_{1.97}MgSi_2O_7:Eu_{0.03}$ in the aforementioned phosphors and the description of "50% Sr" means $(Ca_{0.5}Sr_{0.5})_{1.97}MgSi_2O_7:Eu_{0.03}$ in the aforementioned phosphors. Other phosphors are exactly alike.

It is understood from the investigation of the results shown in FIG. 8 and FIG. 9 that the emission spectrum of $Ca_{1.97}MgSi_2O_7:Eu_{0.03}$ which is a phosphor having the base composition is observed on the longer wavelength side compared to the emission spectrum of $Sr_{1.97}MgSi_2O_7:Eu_{0.03}$ which is similarly a phosphor having the base composition. As in the case of a $Eu^{2+}$-activated silicate green-emitting phosphor $(Ca_{0.5}Sr_{0.5})_{1.97}MgSi_2O_7:Eu_{0.03}$ shown in FIG. 8, it is understood from each emission spectrum of a $Eu^{2+}$-activated silicate green-emitting phosphor of an embodiment in the present invention that any of the entire emission spectra shifts to the lower wavelength side compared to the emission spectrum of $Ca_{1.97}MgSi_2O_7:Eu_{0.03}$ which is a phosphor having the base composition. And, at the same time, it is understood from each emission spectrum of a $Eu^{2+}$-activated silicate green-emitting phosphor of an embodiment in the present invention that any of the entire emission spectra shifts to the longer wavelength side compared to the emission spectrum of $Sr_{1.97}MgSi_2O_7:Eu_{0.03}$ which is a phosphor having the base composition.

As a result, in each emission spectrum of $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$ as the $Eu^{2+}$-activated silicate green-emitting phosphors in an embodiment of the present invention upon excitation by vacuum ultraviolet light at a wavelength of 172 nm, each maximum of the emission band exists in the wavelength region between the maximum of the emission band of the phosphor $Ca_{1.97}MgSi_2O_7:Eu_{0.03}$ having the base composition and the maximum of the emission band of the phosphor $Sr_{1.97}MgSi_2O_7:Eu_{0.03}$ having the base composition, which is observed at a shorter wavelength side.

Moreover, according to each of the aforementioned $Eu^{2+}$-activated silicate green-emitting phosphors, it is understood that with increasing mole fraction of the Ca component, the wavelength of the maximum of the emission band in the emission spectrum starts to be smaller. As a result, even if each of the aforementioned $Eu^{2+}$-activated silicate green-emitting phosphors and the two phosphors having the base composition thereof are taken into consideration, it is understood that with increasing mole fraction of the Sr component contained in the phosphor, the wavelength of the maximum of the emission band in the emission spectrum starts to be smaller.

Figure 10:
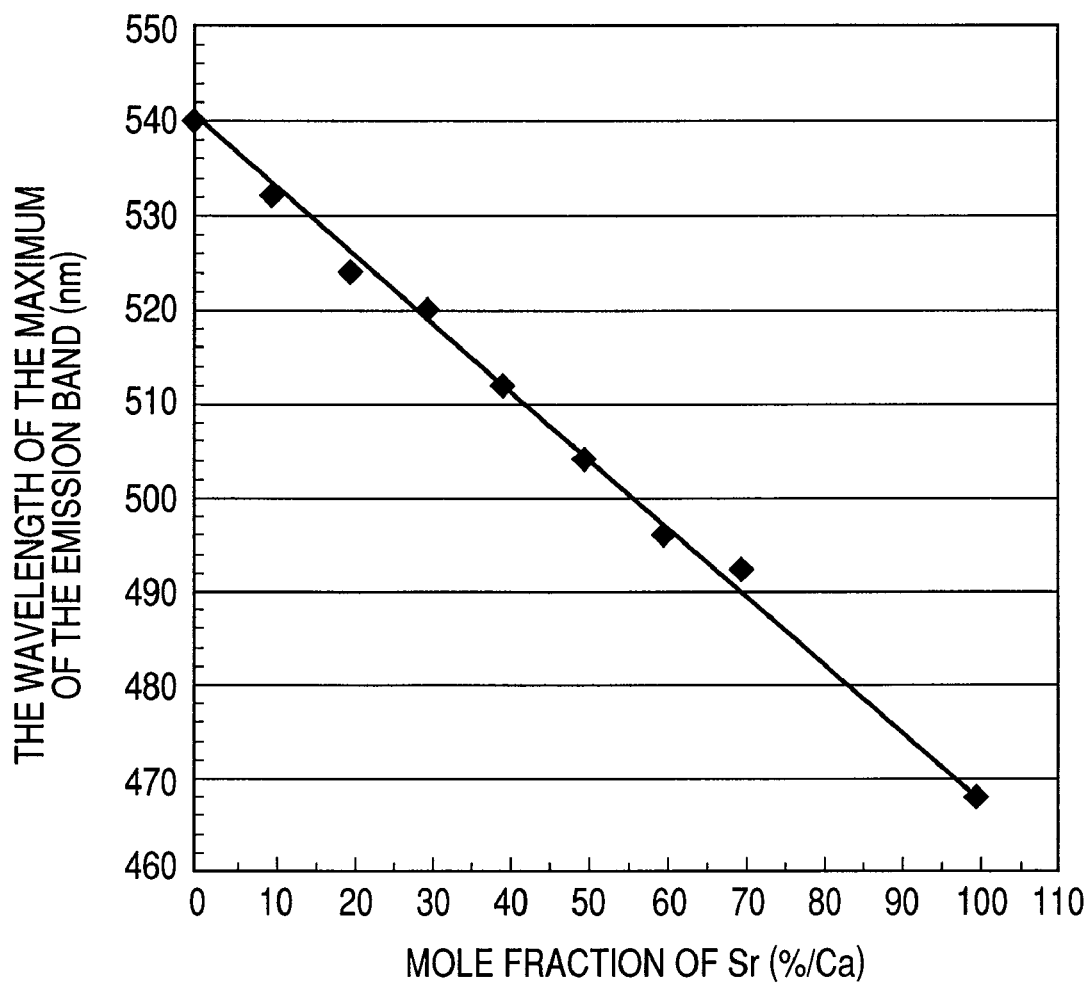
FIG. 10 is a viewgraph illustrating plots of the wavelength of the maximum of the emission band in the emission spectrum of the novel $Eu^{2+}$-activated silicate green-emitting phosphor and the phosphor having the base composition constituting a PDP device of an embodiment of the present invention relative to the mole fraction of the Sr component (%/Ca) contained in each phosphor.

FIG. 10 is a viewgraph illustrating plots of the wavelength of the maximum of the emission band in the emission spectrum of each phosphor against the mole fraction of the Sr component relative to the Ca component (%/Ca) contained in each phosphor in $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{003}$, and $(Ca_{0.3}Sr_{0.7})_{1.97}MgSi_2O_7:Eu_{0.03}$ as the novel $Eu^{2+}$-activated silicate green-emitting phosphor in an embodiment of the present invention and $Ca_{1.97}MgSi_2O_7:Eu_{0.03}$ and $Sr_{1.97}MgSi_2O_7:Eu_{0.03}$ as $Eu^{2+}$-activated silicate phosphors having the base composition. In FIG. 10, the mole fraction of the Sr content relative to the Ca content in each phosphor is expressed as a percent (%). Therefore, the mole fraction of the Sr content in $Ca_{1.97}MgSi_2O_7:Eu_{0.03}$ is shown as 0%; $Sr_{1.97}MgSi_2O_7:Eu_{0.03}$ is shown as 100%; and the mole fraction of the Sr content in $(Ca_{0.5}Sr_{0.5})_{1.97}MgSi_2O_7:Eu_{0.03}$ is shown as 50%.

As shown in FIG. 10, according to the aforementioned $Eu^{2+}$-activated silicate green-emitting phosphor including the above-mentioned two phosphors having the base composition, it is understood that there is a relationship having good linearity between the included mole fraction of Sr component and the position where the emission spectrum appears, that is, the position of the maximum of the emission band (the wavelength) upon excitation by light at a wavelength of 172 nm.

Therefore, in the $Eu^{2+}$-activated silicate green-emitting phosphor represented by the aforementioned general formula (2) of an embodiment in the present invention, it is understood that the position of the emission spectrum and the wavelength characteristics upon excitation by light at a wavelength of 172 nm can be desirably controlled by controlling the included mole fraction of Sr component in the wavelength region between the emission spectrum of $Ca_{1.97}MgSi_2O_7:Eu_{0.03}$ having the base composition and the emission spectrum of $Sr_{1.97}MgSi_2O_7:Eu_{0.03}$ having the base composition where the emission spectrum appears to shift toward the shorter wavelength side.

Therefore, in the $Eu^{2+}$-activated silicate green-emitting phosphor represented by the aforementioned general formula (2) of an embodiment in the present invention, it is understood that the maximum of the emission band of the emission spectrum and the wavelength value upon excitation by light at a wavelength of 172 nm can be desirably controlled by controlling the included mole fraction of Sr component in the wavelength region between the maximum of the emission band of the emission spectrum of $Ca_{1.97}MgSi_2O_7:Eu_{0.03}$ having the base composition and the maximum of the emission band of the emission spectrum of $Sr_{1.97}MgSi_2O_7:Eu_{0.03}$ having the base composition where the emission spectrum appears to shift toward the shorter wavelength side.

From the above findings, according the $Eu^{2+}$-activated silicate green-emitting phosphor represented by the aforementioned general formula (2) of an embodiment in the present invention, it is understood that the emission color characteristics upon excitation by light at a wavelength of 172 nm can be desirably controlled by controlling the included mole fraction of Sr component between the emission color characteristics of $Ca_{1.97}MgSi_2O_7:Eu_{0.03}$ having the base composition and the emission color characteristics of $Sr_{1.97}MgSi_2O_7:Eu_{0.03}$ having the base composition.

Figure 11:
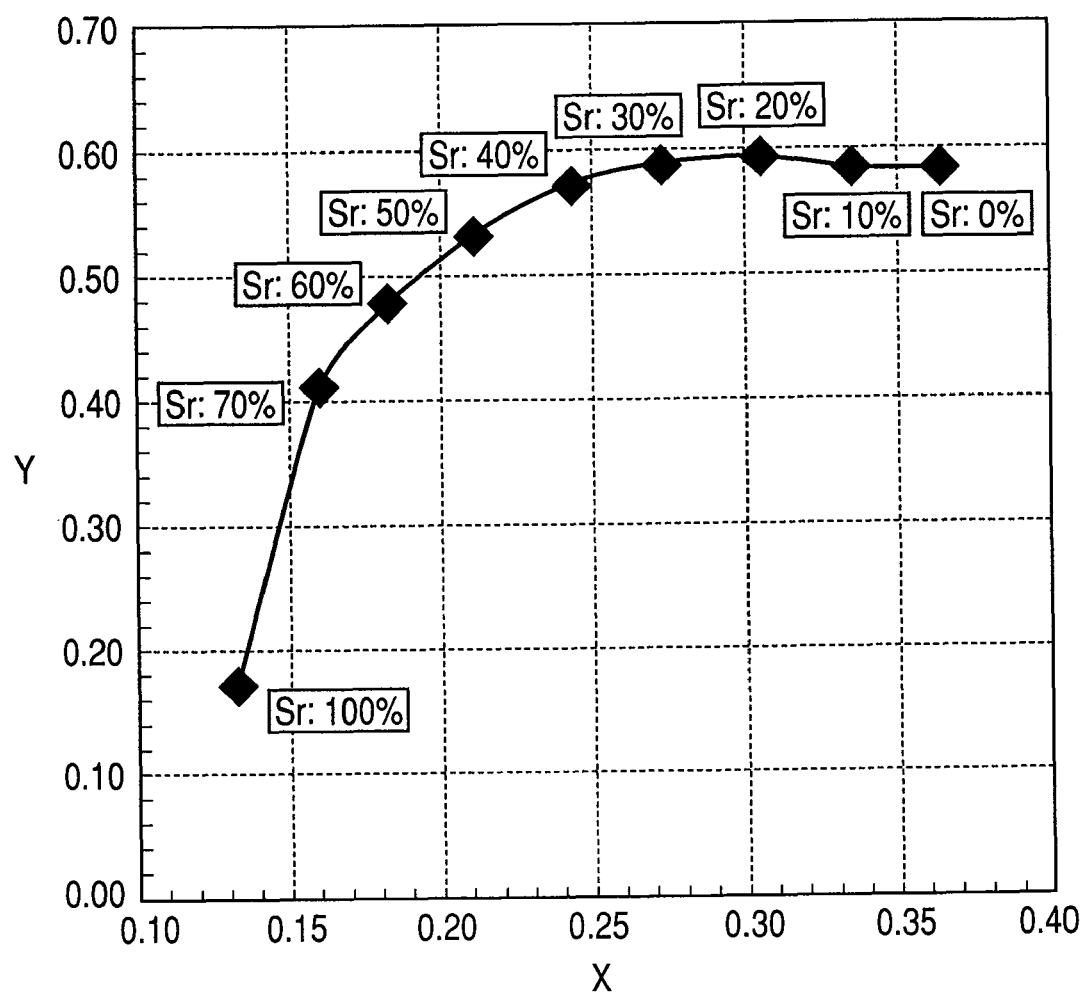
FIG. 11 is a viewgraph illustrating plots of the chromaticity (x, y) plotted on the XYZ chromaticity diagram coordinates upon excitation by light at a wavelength of 172 nm according to the $Eu^{2+}$-activated silicate green-emitting phosphor and the phosphor having the base composition constituting a PDP device of an embodiment of the present invention.

FIG. 11 is a viewgraph illustrating plots of emission color characteristics, that is, chromaticity (x, y) plotted on the XYZ chromaticity diagram coordinates upon excitation by light at a wavelength of 172 nm, according to $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:EU_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$ as the $Eu^{2+}$-activated silicate green-emitting phosphors in an embodiment of the present invention and $Ca_{1.97}MgSi_2O_7:Eu_{0.03}$ and $Sr_{1.97}MgSi_2O_7:Eu_{0.03}$ as the $Eu^{2+}$-activated silicate phosphors having the base composition.

In FIG. 11, in order to understand which plot represents which chromaticity data of which phosphor, a description, for instance, "Sr: 0%" is shown in the vicinity of the corresponding plot in the figure. Specifically, the descriptions are as follows; $(Ca_{0.9}Sr_{0.1})_{1.97}MgSi_2O_7:Eu_{0.03}$ is shown as "Sr: 10%"; $(Ca_{0.8}Sr_{0.2})_{1.97}MgSi_2O_7:Eu_{0.03}$ as "Sr: 20%"; $(Ca_{0.7}Sr_{0.3})_{1.97}MgSi_2O_7:Eu_{0.03}$ as "Sr: 30%"; $(Ca_{0.6}Sr_{0.4})_{1.97}MgSi_2O_7:Eu_{0.03}$ as "Sr: 40%"; $(Ca_{0.5}Sr_{0.5})_{1.97}MgSi_2O_7:Eu_{0.03}$ as "Sr: 50%"; $(Ca_{0.4}Sr_{0.6})_{1.97}MgSi_2O_7:Eu_{0.03}$ as "Sr: 60%"; and $(Ca_{0.3}Sr_{0.7})_{1.97}MgSi_2O_7:Eu_{0.03}$ as "Sr: 70%". In addition, $Ca_{1.97}MgSi_2O_7:Eu_{0.03}$ which is a $Eu^{2+}$-activated silicate phosphor having the base composition is shown as "Sr: 0%" in FIG. 11 and $Sr_{1.97}MgSi_2O_7:Eu_{0.03}$ having the base composition is shown as "Sr: 100%".

From the results shown in FIG. 11, according to $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$ as the $Eu^{2+}$-activated silicate green-emitting phosphors in an embodiment of the present invention, it is understood that the color thereof gradually changes corresponding to the mole fraction of Sr component between the color of $Ca_{1.97}MgSi_2O_7:Eu_{0.03}$ which is the $Eu^{2+}$-activated silicate phosphor having the base composition and $Sr_{1.97}MgSi_2O_7:Eu_{0.03}$ where all the Ca component is substituted by the Sr component.

Specifically, according to the $Eu^{2+}$-activated silicate green-emitting phosphor in an embodiment of the present invention represented by the general formula (2), it is understood that a relationship exists between the Sr content and the color characteristics.

Therefore, according to the $Eu^{2+}$-activated silicate green-emitting phosphor in an embodiment of the present invention represented by the general formula (2), it is understood that the emission color upon excitation by light at a wavelength of 172 nm can be desirably controlled by controlling the mole fraction of Sr component included therein between the color of $Ca_{1.97}MgSi_2O_7:Eu_{0.03}$ which is the $Eu^{2+}$-activated silicate phosphor having the base composition and the color of $Sr_{1.97}MgSi_2O_7:Eu_{0.03}$ where all the Ca component is substituted by the Sr component.

Next, it is considered that a preferable color be selected, that is, to select a preferable composition in consideration of using a PDP, according to the $Eu^{2+}$-activated silicate green-emitting phosphor in an embodiment of the present invention represented by the general formula (2).

When a PDP device is applied to TVs, in particular, color TVs which are a main application of the flat panel display, color characteristics and the color specification region are required as the display with consideration given to the chromaticity of each color, R (red), G, (green), and B (blue), of each broadcast system and corresponding thereto.

Currently, although adherence to the NTSC (National Television System Committee) standard which is a conventional broadcast system is required, adherence to the HDT (High Definition TeleVision) standard which is expected to be mainstream in the future will become a more important issue.

In the HDTV standard, the defined chromaticity (x, y) of the green color is x=0.03 and y=0.60, and it is required to realize faithful color reproduction, preferable color expression, and wider color reproduction, so as to ensure 100% or more of the color specification region with respect to the HDTV standard. As a result, according to the green-emitting phosphor corresponding to G (green) in a PDP device, the x value, in the x value and y value of the chromaticity (x, y) of the emission color, is required to have a value close to 0.30 or a little bit smaller value in order to express a deeper color and y value should have a value close to 0.60 or 0.60 or more which can widen the color reproduction region.

Therefore, in order to use the $Eu^{2+}$-activated silicate green-emitting phosphor represented by the general formula (2) for a PDP device applicable for a color TV, it is preferable that the color characteristics, specifically, the x value of the chromaticity (x, y) be close to 0.30 or less and the y value be close to 0.60 or more.

Therefore, selection of a preferable phosphor composition is considered based on the evaluation results of the aforementioned emission color characteristics and the given results shown in FIG. 11. First, according to the $Eu^{2+}$-activated silicate green-emitting phosphor in an embodiment of the present invention represented by the general formula (2), it is understood from FIG. 11 that, with an increase in the mole fraction of the Sr component, the x value of the chromaticity (x, y) of the emission color of the corresponding phosphor upon excitation by light at a wavelength of 172 nm gradually becomes smaller between x=0.37 of the phosphor $Ca_{1.97}MgSi_2O_7:Eu_{0.03}$ having the base composition and x=0.13 of the phosphor $Sr_{1.97}MgSi_2O_7:Eu_{0.03}$ having the base composition.

On the other hand, the y value of chromaticity (x, y) of the emission color upon excitation by light at a wavelength 172 nm increases to the neighborhood of 0.59, with an increase of the mole fraction of the Sr component from $Ca_{1.97}MgSi_2O_7:Eu_{0.03}$ having the base composition to $(Ca_{0.9}Sr_{0.1})_{1.97}MgSi_2O_7:Eu_{0.03}$ where 10% of the Sr component is contained to the the Ca component. Then, after that, with an increase of the mole fraction of the Sr component, the y value of chromaticity (x, y) of the emission color is kept almost constant, as large as 0.59, until the $(Ca_{0.7}Sr_{0.3})_{1.97}MgSi_2O_7:Eu_{0.03}$ where 30% of Sr component is contained relative to the Ca component. And, furthermore, when the mole fraction of the Sr component increases beyond 30% of the mole fraction of the Sr content relative to the Ca component, the y value of chromaticity (x, y) of the emission color of the corresponding phosphor starts to drop off, from 0.59 to y=0.17 which is the chromaticity (x, y) of $Sr_{1.97}MgSi_2O_7:Eu_{0.03}$ having the base composition.

According to the detailed analyses of the chromaticity characteristics of the emission color, $(Ca_{0.8}Sr_{0.2})_{1.97}MgSi_2O_7:Eu_{0.03}$ has the largest y value, as large as y=0.593 among the three phosphors, $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, and $(Ca_{0.7}Sr_{0.3})_{1.97}MgSi_2O_7:Eu_{0.03}$ where the y values of the chromaticity (x, y) are 0.59 in the $Eu^{2+}$-activated silicate green-emitting phosphor in an embodiment of the present invention.

Therefore, according to the $Eu^{2+}$-activated silicate green-emitting phosphor in an embodiment of the present invention, taking $Ca_{1.97}MgSi_2O_7:Eu_{0.03}$ and $Sr_{1.97}MgSi_2O_7:Eu_{0.03}$ which are phosphors having the base compositions into consideration, the characteristic of the y value of emission chromaticity (x, y) upon excitation by light at a wavelength of 172 nm has a composition dependence as follows: it increases with an increase in the mole fraction of the Sr component; it reaches 0.59 when the composition is $(Ca_{0.9}Sr_{0.1})_{1.97}MgSi_2O_7:Eu_{0.03}$; it stays constant up to $(Ca_{0.7}Sr_{0.3})_{1.97}MgSi_2O_7:Eu_{0.03}$; it reaches a peak when it is $(Ca_{0.8}Sr_{0.2})_{1.97}MgSi_2O_7:Eu_{0.03}$; and then it starts decreasing.

Therefore, it becomes possible to select a preferable composition range for a PDP device according to the aforementioned color characteristics of a $Eu^{2+}$-activated silicate green-emitting phosphor in an embodiment of the present invention, that is, the dependence of the emission color on the composition of the phosphor.

Specifically, a composition of the $Eu^{2+}$-activated silicate green-emitting phosphor represented by the aforementioned general formula (2) is selectively used, and it is used as a green-emitting phosphor where the emission color upon excitation by ultraviolet light has an x value of $0.15 \leq x \leq 0.35$ and a y value of $0.45 \leq x \leq 0.75$ in the chromaticity (x, y) in the CIE XYZ calorimetric scale, thereby, a PDP device is provided which is applicable for an HDTV standard TV and which has high emission characteristics.

At this time, the range of the x value is set so as to be close to 0.30 or include a smaller value up to about 0.15 which can express a deeper green color. The range of y values is set so as to have a lower limit to be the value of about 0.60 in consideration of the color specification region and an upper limit to be determined as a value larger than 0.6 which can expand the color reproduction range in consideration of the level which can be achieved with the phosphor.

And, in consideration of a preferable green color and the color specification region, it is preferable to select the phosphor and control the lower limit of the x value in the chromaticity (x, y) in the XYZ calorimetric scale to be 0.2, the lower limit of the y value 0.50, the x value $0.20 \leq x \leq 0.35$, and y value $0.50 \leq y \leq 0.75$.

Specifically, in consideration of the application of a PDP device of the present invention using the $Eu^{2+}$-activated silicate green-emitting phosphor in an embodiment of the present invention represented by the aforementioned general formula (2) to TVs, in particular, to color TVs using HDTV technology which are a main application of flat panel displays, a phosphor composition is preferable which has an x value of about 0.30, in the x value and y value of the chromaticity (x, y), or which can realize a smaller value up to about 0.2 for expressing a deeper green color, especially in the emission color characteristics. And, a phosphor composition is preferable which has a y value of about 0.60 or which can realize 0.6 or more for further expanding the color reproduction range.

Therefore, from the evaluation data summarized in the graph in FIG. 11 and the Table shown in FIG. 9, x representing the mole fraction of the Sr component in the $Eu^{2+}$-activated silicate green-emitting phosphor represented by the aforementioned general formula (2) is preferable to lie in the range $0.1 \leq x \leq 0.5$ which can express a green color from that defined in the HDTV standard to a deeper one.

According to the $Eu^{2+}$-activated silicate green-emitting phosphor represented by the aforementioned general formula (2), it is preferable that the mole fraction of the Sr component, x, be $0.2 \leq x \leq 0.5$ in consideration of making the x value of the chromaticity (x, y) of the emission color smaller and making the green emission color deeper and highly color-purified.

Furthermore, according to the $Eu^{2+}$-activated silicate green-emitting phosphor represented by the aforementioned general formula (2), it is preferable that the mole fraction of the Sr component, x, be $0.2 \leq x \leq 0.4$ in consideration of making the y value of the chromaticity (x, y) of the emission color greater and making the color specification region greater.

Next, in consideration of applications of a PDP device of the present invention to TVs, in particular, to color TVs which are main applications of flat panel displays, from the viewpoint of luminance characteristics of the phosphor which becomes important in this case, selection of a preferable composition of the $Eu^{2+}$-activated silicate green-emitting phosphor in an embodiment of the present invention represented by the aforementioned general formula (2) is discussed.

From the explanatory Table shown in FIG. 9, according to $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$ as the $Eu^{2+}$-activated silicate green-emitting phosphors in an embodiment of the present invention, the photoluminescent brightness upon excitation by light at a wavelength of 172 nm becomes higher than $Ca_{1.97}MgSi_2O_7:Eu_{0.03}$ by containing the Sr component based on the $Eu^{2+}$-activated silicate phosphor, $Ca_{1.97}MgSi_2O_7:Eu_{0.03}$, having the base composition.

And, with an increase in the mole fraction of the Sr component thereof, the luminance becomes greater and the luminance reaches a maximum in $(Ca_{0.7}Sr_{0.3})_{1.97}MgSi_2O_7:Eu_{0.03}$, and then the luminance starts to decrease in the range of mole fractions of Sr component beyond this. The luminance of $(Ca_{0.4}Sr_{0.6})_{1.97}MgSi_2O_7:Eu_{0.03}$ becomes equal to that of the $Eu^{2+}$-activated silicate phosphor, $Ca_{1.97}MgSi_2O_7:Eu_{0.03}$, and becomes lower in the case of. $(Ca_{0.3}Sr_{0.7})_{1.97}MgSi_2O_7:Eu_{0.03}$. And, the composition dependence is shown so as that $Sr_{1.97}MgSi_2O_7:Eu_{0.03}$ has the lowest luminance, where all the Ca components are substituted by Sr components.

When a $Eu^{2+}$-activated silicate phosphor, $Ca_{1.97}MgSi_2O_7:Eu_{0.03}$, having the base composition is used as the base, the photoluminescent brightness of the $Eu^{2+}$-activated silicate green-emitting phosphor represented by the aforementioned general formula (2) upon excitation by light at a wavelength of 172 nm is equal to or higher than that of the $Eu^{2+}$-activated silicate phosphor, $Ca_{1.97}MgSi_2O_7:Eu_{0.03}$, having the base composition and, in consideration of making a high luminance PDP device of the present invention possible, the x value representing the mole fraction of the Sr component is preferably $0.1 \leqq x \leqq 0.6$.

As mentioned above, according to the $Eu^{2+}$-activated silicate green-emitting phosphor represented by the aforementioned general formula (2), the x value of the mole fraction of the Sr component is preferably $0.2 \leqq x \leqq 0.6$ in consideration of the emission color characteristics and in consideration of making the x value representing the chromaticity (x, y) of the emission color smaller and making the green emission color deeper and highly color-purified.

And, according to the $Eu^{2+}$-activated silicate green-emitting phosphor in the embodiment of the present invention represented by the aforementioned general formula (2), when it is taken into consideration that the photoluminescent brightness thereof upon excitation by light at a wavelength of 172 nm is higher than that of the $Eu^{2+}$-activated silicate phosphor, $Ca_{1.97}MgSi_2O_7:Eu_{0.03}$, having the base composition, the x value of the mole fraction of the Sr component is more preferably $0.2 \leqq x \leqq 0.6$ because the PDP device of the present invention can be made highly color-purified.

According to the phosphor represented by the aforementioned general formula (2), although a phosphor where the M3 component is Mg has been explained as an embodiment of the present invention, at least one element selected from the group of Mg and Zn can be used for the M3 component and, for instance, it is possible to make the composition including only Zn or both Mg and Zn for the M3 component. The Zn component has an ionic radius different from the aforementioned Mg component and, by making the composition containing it in the phosphor, it can be expected to form a different crystal structure from the phosphor containing Mg components in the composition. As a result, emission characteristics, in particular, the luminance and emission color characteristics of the phosphor containing Zn components can be controlled, and it becomes possible to obtain a phosphor having desired emission characteristics for a PDP.

Accordingly, a PDP is configured, which is the second embodiment of the present invention, using a $Eu^{2+}$-activated silicate green-emitting phosphor represented by the aforementioned general formula (2). Concretely, it can be configured similar to the PDP 100 shown in FIG. 4 to FIG. 7 which is an embodiment of the present invention using the $Eu^{2+}$-activated silicate green-emitting phosphor represented by the aforementioned general formula (1).

Specifically, a phosphor layer 10 containing the $Eu^{2+}$-activated silicate phosphor represented by the $Eu^{2+}$-activated silicate green-emitting phosphor shown as the aforementioned general formula (1) is formed on one of the facing sides of the pair of substrates 1, 6 (substrate 6 side) and on the wall surface of the barrier ribs 7. The phosphor 10 can be formed by using the $Eu^{2+}$-activated silicate green-emitting phosphor represented by the aforementioned general formula (2) as well as the $Eu^{2+}$-activated silicate green-emitting phosphor represented by the aforementioned general formula (1).

And, in this case, the phosphor layer 10 normally includes phosphors corresponding to the light emission of three colors including red, blue, and green, i.e., a red-emitting phosphor, a blue-emitting phosphor, or a green-emitting phosphor such that the phosphor containing the $Eu^{2+}$-activated silicate phosphor represented by the aforementioned general formula (2) for providing the green color in the phosphor layer 10 and the phosphors for providing the other colors (red and blue) are excited by vacuum ultraviolet of 146 nm and 172 nm wavelengths generated from the discharge gas by the electric discharge for emitting visible light.

Hereinafter, embodiments corresponding to the best mode for carrying out the invention will be explained.

First Embodiment

To produce a PDP as a first embodiment of the present invention, first, an $Eu^{2+}$-activated silicate green-emitting phosphor as an essential constituent member of the present invention was synthesized.

The composition of the first synthesized $Eu^{2+}$-activated silicate green-emitting phosphor was $(Ca_{0.9}Sr_{0.1})_{1.98}MgSi_2O_7:Eu_{0.02}$.

For the synthesis of a phosphor, first, 1.784 g (17.82 mmol) of $CaCO_3$, 0.292 g (1.98 mmol) of $SrCO_3$, 0.962 g (10.00 mmol) of $MgCO_3$, 1.322 g (22.00 mmol) of $SiO_2$, 0.0352 g (0.100 mmol) of $Eu_2O_3$, and 0.0160 g (0.300 mmol) of $NH_4Cl$ as a flux were respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor with the above composition.

Next, a $Eu^{2+}$-activated silicate green-emitting phosphor, $(Ca_{0.9}Sr_{0.1})_{1.98}MgSi_2O_7:Eu_{0.02}$, was synthesized.

For the synthesis of a phosphor, in the same manner as described above, 1.784 g (17.82 mmol) of $CaCO_3$, 0.391 g (1.98 mmol) of $BaCO_3$, 0.962 g (10.00 mmol) of $MgCO_3$, 1.322 g (22.00 mmol) of $SiO_2$, 0.0352 g (0.100 mmol) of $Eu_2O_3$, and 0.0160 g (0.300 mmol) of $NH_4Cl$ as a flux were respectively weighed and fully mixed in an agate mortar.

Thereafter, the obtained mixture was changed into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor of the above composition.

Next, as a comparison, a phosphor $Ca_{1.98}MgSi_2O_7:Eu_{0.02}$ which had a composition to be a base for the above-mentioned phosphor was synthesized.

For the synthesis of a phosphor, in the same manner as described above, 1.982 g (19.80 mmol) of $CaCO_3$, 0.962 g (10.00 mmol) of $MgCO_3$, 1.322 g (22.00 mmol) of $SiO_2$, 0.0352 g (0.100 mmol) of $Eu_2O_3$, and 0.0160 g (0.300 mmol) of $NH_4Cl$ as a flux were respectively weighed and fully mixed in an agate mortar.

Thereafter, the obtained mixture was changed into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor with the above composition for the comparative example.

Next, measurements of the emission spectra of the obtained phosphors $(Ca_{0.9}Sr_{0.1})_{1.98}MgSi_2O_7:Eu_{0.02}$ and the $(Ca_{0.9}Ba_{0.1})_{1.98}MgSi_2O_7:Eu_{0.02}$ were carried out by using a vacuum ultraviolet light excimer lamp having a central emission wavelength of 172 nm as a light source according to an established rule. As a comparison, the emission spectrum of the phosphor $Ca_{1.98}MgSi_2O_7:Eu_{0.02}$ which was the base composition was also measured. The results are shown in FIG. 1.

As described above, it was understood from the emission spectra of the phosphor $(Ca_{0.9}Sr_{0.1})_{1.98}MgSi_2O_7:Eu_{0.02}$ and the phosphor $(Ca_{0.9}Ba_{0.1})_{1.98}MgSi_2O_7:Eu_{0.02}$ shown in FIG. 1 that any of the entire emission spectra shifted to the shorter wavelength side compared to the emission spectrum of the phosphor $Ca_{1.98}MgSi_2O_7:Eu_{0.02}$.

At the same time, using a $Mn^{2+}$-activated zinc silicate phosphor $Zn_2SiO_4:Mn$, which was a conventional green-emitting phosphor that could be purchased, the emission spectrum was measured upon excitation by vacuum ultraviolet light by a wavelength of 172 nm in a similar manner. As a result, the maximum of the emission band of the $Mn^{2+}$-activated zinc silicate phosphor, $Zn_2SiO_4:Mn$, was 528 nm.

Next, in the same manner, measurements of the emission spectra of the obtained phosphors $(Ca_{0.9}Sr_{0.1})_{1.98}MgSi_2O_7:Eu_{0.02}$, the $(Ca_{0.9}Ba_{0.1})_{1.98}MgSi_2O_7:Eu_{0.02}$, and $Ca_{1.98}MgSi_2O_7:Eu_{0.02}$ were carried out by using a vacuum ultraviolet light excimer lamp having a central emission wavelength of 146 nm as a light source according to an established rule in the same manner.

Evaluation and analytical results of the emission characteristics are shown in FIG. 2. When the emission spectra were measured by using vacuum ultraviolet light at emission wavelengths of 146 nm and 172 nm, according to the $Eu^{2+}$-activated silicate green-emitting phosphor $(Ca_{0.9}Sr_{0.1})_{1.98}MgSi_2O_7:Eu_{0.02}$ and the $Eu^{2+}$-activated silicate green-emitting phosphor $(Ca_{0.9}Ba_{0.1})_{1.98}MgSi_2O_7:Eu_{0.02}$, it was understood that any of entire emission spectra shifts to the shorter wavelength side compared to that of the phosphor $Ca_{1.98}MgSi_2O_7:Eu_{0.02}$ having the base composition.

And the shift of the emission spectrum to shorter wavelength side depends on the wavelength of the vacuum ultraviolet light for exciting the phosphor sample, and a larger shift to the shorter wavelength side can be observed upon excitation by vacuum ultraviolet light at a wavelength of 172 nm than with excitation by vacuum ultraviolet light at a wavelength of 146 nm.

Accordingly, when the $Eu^{2+}$-activated silicate green-emitting phosphor $(Ca_{0.9}Sr_{0.1})_{1.98}MgSi_2O_7:Eu_{0.02}$ and the $Eu^{2+}$-activated silicate green-emitting phosphor $(Ca_{0.9}Ba_{0.1})_{1.98}MgSi_2O_7:Eu_{0.02}$ are used for the PDP using a discharge gas containing a Xe composition, since high emissions are a result of excitation by ultraviolet light at a wavelength of 172 nm as well as that of 146 nm, the $Xe_2$ molecular line which is discharged can also be utilized effectively so that a high performance PDP can be provided.

Moreover, the $Eu^{2+}$-activated silicate green-emitting phosphor $(Ca_{0.9}Sr_{0.1})_{1.98}MgSi_2O_7:Eu_{0.02}$ and the $Eu^{2+}$-activated silicate green-emitting phosphor $(Ca_{0.9}Ba_{0.1})_{1.98}MgSi_2O_7:Eu_{0.02}$ are suitable for so-called high-Xe PDP designs which use a discharge gas containing Xe gas with a Xe-concentration of, for instance, 6% and more, preferably 10% or more where the Xe molecular line is aggressively utilized, thereby, it is understood that an emission device which can emit an excellent green color is configured in a high-Xe PDP design using a discharge gas.

Next, the PDP 100 which was an emission device was manufactured by using the aforementioned $Eu^{2+}$-activated silicate green-emitting phosphor $(Ca_{0.9}Sr_{0.1})_{1.98}MgSi_2O_7:Eu_{0.02}$ as a green-emitting phosphor constituting the green phosphor layer.

In a PDP 100 of the surface-discharge color PDP device as shown in the first embodiment, a negative voltage is applied to one of a pair of display electrodes (electrode 2) (generally referred to as a "scanning electrode") and a positive voltage (a positive voltage as compared with the voltage applied to the aforementioned display electrodes) is applied to the address electrode (electrode 9) and the other display electrode (electrode 2) so as to allow discharge. This makes a wall charge between the pair of display electrodes, thus serving as an auxiliary for initiating discharge (This is referred to as "write"). A suitable reverse voltage is applied between the pair of display electrodes 2 in this state, resulting in discharge via the dielectric layer 4 (and the protective layer 5) in a discharge space between the two electrodes.

After the completion of discharge, the voltage applied to the display electrodes 2 is reversed so as to induce another discharge. Discharge occurs continuously by repeating this procedure (this is referred to as a sustain discharge or display discharge).

For preparing the PDP 100 of the first embodiment, after forming the address electrode (electrode 9) made of silver or the like, and the dielectric layer 4 made of a glass-based material on the rear substrate 6, a barrier rib material, similarly made of a glass-based material is printed as a thick film, and the barrier rib 7 is formed by blasting using a blast mask.

Next, each phosphor layer 10 of red, green, and blue is formed on the barrier rib 7, in order, in a stripe-like shape so as to cover a grooved surface between the barrier ribs 7.

Here, each phosphor layer 10 corresponds to red, green, and blue, and they are respectively formed by preparing a phosphor paste by mixing 40 parts by weight of a red-emitting phosphor particle (60 parts by weight of vehicle), 40 parts by weight of a green-emitting phosphor particle (60 parts by weight of vehicle), and 35 parts by weight of a green-emitting phosphor particle (65 parts by weight of vehicle). After applying them by screen printing, they are subjected to drying and heating to evaporate volatile components and burn-off organic substances in the phosphor paste. The phosphor particles used in the phosphor layers 10 of the first embodiment have a mean particle diameter of about 3 μm.

Moreover, as to the material of the phosphors other than the green, the red-emitting phosphor is a 1:1 mixture of a $(Y, Gd)BO_3:Eu$ phosphor and $Y_2O_3:Eu$ phosphor, and the blue-emitting phosphor is a BAM $(BaMgAl_{10}O_{17}:Eu^{2+})$ phosphor.

Next, after the front substrate (substrate 1) bearing display electrodes (electrode 2), bus-electrodes 3, the dielectric layer 4, and the protective layer 5 is sealed with the back substrate (substrate 6) with a frit and the inside of the panel is evacuated, a discharge gas is fed into the panel, and the panel is sealed. The discharge gas is a gas mixture mainly containing Xe gas having a mole fraction of 10%. The PDP 100 according to the first embodiment has a type 3 size and a single pixel has a pitch of 1000 μm×1000 μm.

Next, a plasma display device was prepared by using the PDP including a $Eu^{2+}$-activated silicate phosphor of the first embodiment of the present invention, and it was configured for displaying images in combination with a driving circuit for driving the PDP.

The plasma display device had high luminance and excellent display performance, and a high luminance display was possible. According to evaluation of the decay characteristics of the green color, the decay time was as short as 1 ms and equal to the characteristics of the blue-emitting phosphor (BAM) used for a plasma display device.

As a result, the problem in the conventional plasma display device prepared by using a conventional $Mn^{2+}$-activated zinc silicate phosphor $Zn_2SiO_4:Mn$, that is, the generation of the phenomenon where the previous image, the green color, remains on the display regardless of switching the display, can be sufficiently suppressed, resulting in superior video display being achieved.

The PDP of the present invention is prepared by using the novel $Eu^{2+}$-activated silicate green-emitting phosphor of the present invention, and a PDP having excellent decay characteristics is enabled in the mode where it is combined with a $Mn^{2+}$-activated zinc silicate phosphor $Zn_2SiO_4$:Mn having poor decay characteristics and substitutes a part of the green-emitting phosphor.

In this case, it is preferable that the mixture ratio thereof be controlled to (novel $Eu^{2+}$-activated silicate green-emitting phosphor)/($Zn_2SiO_4$:Mn)$\geq 1$, that is, the ratio of the novel $Eu^{2+}$-activated silicate green-emitting phosphor of the present invention being assumed to be more than half. Since the decay time of the phosphor $Zn_2SiO_4$:Mn is about 10 ms and that of the novel $Eu^{2+}$-activated silicate green-emitting phosphor of the present invention is 1 ms, the decay time can be controlled to be about 5 ms or less by making this composition ratio, and the phenomenon where the green color remains on the display after switching the display can be reduced so that the viewers cannot recognize it.

Moreover, a PDP can be prepared by mixing the novel $Eu^{2+}$-activated silicate green-emitting phosphor of the present invention with one or more phosphors selected from the group consisting of (Y, Gd, Sc)$_2$SiO$_5$:Tb, (Y, Gd)$_3$(Al, Ga)$_5$O$_{12}$:Tb, (Y, G d)$_3$(Al, Ga)$_5$O$_{12}$:Ce, (Y, Gd) B$_3$O$_6$:Tb and (Y, Gd) PO$_4$:Tb as a substitute for a $Mn^{2+}$-activated zinc silicate phosphor $Zn_2SiO_4$:Mn.

Although detailed investigation results are not described for the red and blue phosphors in the first embodiment, a PDP can be prepared in the same manner also with the phosphors of each composition listed below.

For example, as the red-emitting phosphor, at least one phosphor selected from the group consisting of (Y, Gd) BO$_3$:Eu, (Y, Gd)$_2$O$_3$:Eu and (Y, Gd) (P, V) O$_4$:Eu can be used. And as the blue-emitting phosphor, at least one phosphor selected from the group consisting of CaMgSi$_2$O$_6$:Eu, Ca$_3$MgSi$_2$O$_8$:Eu, Ba$_3$MgSi$_2$O$_8$:Eu, and Sr$_3$MgSi$_2$O$_8$:Eu can be used. Furthermore, a combination with a phosphor not shown here is applicable.

Second Embodiment

For another embodiment of the present invention, in order to produce a PDP using a green-emitting phosphor different from the first embodiment, first, a $Eu^{2+}$-activated silicate phosphor as an essential constituent member of the present invention was synthesized.

The composition of the first synthesized $Eu^{2+}$-activated silicate green-emitting phosphor was $(Ca_{0.9}Sr_{0.1})_{1.97}MgSi_2O_7$:$Eu_{0.03}$.

For the synthesis of a phosphor, first, 0.887 g (8.86 mmol) of CaCO$_3$, 0.146 g (0.99 mmol) of SrCO$_3$, 0.481 g (5.00 mmol) of MgCO$_3$, 0.601 g (10.00 mmol) of SiO$_2$, 0.0264 g (0.075 mmol) of Eu$_2$O$_3$, and 0.196 g (2.00 mmol) of NH$_4$Br as a flux are respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor of the above composition.

Next, the phosphor, $(Ca_{0.8}Sr_{0.2})_{1.97}MgSi_2O_7$:$Eu_{0.03}$, was synthesized. For the synthesis of a phosphor, in the same manner as described above, 0.789 g (7.88 mmol) of CaCO$_3$, 0.291 g (1.97 mmol) of SrCO$_3$, 0.481 g (5.00 mmol) of MgCO$_3$, 0.601 g (10.00 mmol) of SiO$_2$, 0.0264 g (0.075 mmol) of Eu$_2$O$_3$, and 0.196 g (2.00 mmol) of NH$_4$Br as a flux were respectively weighed and fully mixed in an agate mortar.

Thereafter, the obtained mixture was changed into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor powder of the above composition.

Next, the phosphor, $(Ca_{0.7}Sr_{0.3})_{1.97}MgSi_2O_7$:$Eu_{0.03}$, was synthesized. For the synthesis of a phosphor, in the same manner as described above, 0.690 g (6.89 mmol) of CaCO$_3$, 0.436 g (2.95 mmol) of SrCO$_3$, 0.481 g (5.00 mmol) of MgCO$_3$, 0.601 g (10.00 mmol) of SiO$_2$, 0.0264 g (0.075 mmol) of Eu$_2$O$_3$, and 0.196 g (2.00 mmol) of NH$_4$Br as a flux were respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor powder of the above composition.

Next, the phosphor, $(Ca_{0.6}Sr_{0.4})_{1.97}MgSi_2O_7$:$Eu_{0.03}$, was synthesized. For the synthesis of a phosphor, in the same manner as described above, 0.591 g (5.90 mmol) of CaCO$_3$, 0.582 g (3.94 mmol) of SrCO$_3$, 0.481 g (5.00 mmol) of MgCO$_3$, 0.601 g (10.00 mmol) of SiO$_2$, 0.0264 g (0.075 mmol) of Eu$_2$O$_3$, and 0.196 g (2.00 mmol) of NH$_4$Br as a flux were respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor powder of the above composition.

Next, the phosphor, $(Ca_{0.5}Sr_{0.5})_{1.97}MgSi_2O_7$:$Eu_{0.03}$, was synthesized. For the synthesis of a phosphor, in the same manner as described above, 0.493 g (4.93 mmol) of CaCO$_3$, 0.727 g (4.92 mmol) of SrCO$_3$, 0.481 g (5.00 mmol) of MgCO$_3$, 0.601 g (10.00 mmol) of SiO$_2$, 0.0264 g (0.075 mmol) of Eu$_2$O$_3$, and 0.196 g (2.00 mmol) of NH$_4$Br as a flux were respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor powder of the above composition.

Next, the phosphor, $(Ca_{0.4}Sr_{0.6})_{1.97}MgSi_2O_7$:$Eu_{0.03}$, was synthesized. For the synthesis of a phosphor, in the same manner as described above, 0.394 g (3.94 mmol) of CaCO$_3$, 0.873 g (5.91 mmol) of SrCO$_3$, 0.481 g (5.00 mmol) of MgCO$_3$, 0.601 g (10.00 mmol) of SiO$_2$, 0.0264 g (0.075 mmol) of Eu$_2$O$_3$, and 0.196 g (2.00 mmol) of NH$_4$Br as a flux were respectively weighed and fully mixed in an agate mortar.

Thereafter, the obtained mixture is charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor powder of the above composition.

Next, the phosphor, $(Ca_{0.3}Sr_{0.7})_{1.97}MgSi_2O_7$:$Eu_{0.03}$, was synthesized. For the synthesis of a phosphor, in the same manner as described above, 0.296 g (2.96 mmol) of CaCO$_3$, 1.018 g (6.90 mmol) of SrCO$_3$, 0.481 g (5.00 mmol) of $MgCO_3$, 0.601 g (10.00 mmol) of $SiO_2$, 0.0264 g (0.075 mmol) of $Eu_2O_3$, and 0.196 g (2.00 mmol) of $NH_4Br$ as a flux were respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product is pulverized, washed with water and dried so as to obtain a silicate phosphor powder of the above composition.

Next, a phosphor having the base composition of a $Eu^{2+}$-activated green-emitting phosphor of the present invention was synthesized. First, the phosphor, $Ca_{1.97}MgSi_2O_7:Eu_{0.03}$, was synthesized. For the synthesis of a phosphor, in the same manner as each phosphor example described above, 0.986 g (9.85 mmol) of $CaCO_3$, 0.481 g (5.00 mmol) of $MgCO_3$, 0.601 g (10.00 mmol) of $SiO_2$, 0.0264 g (0.075 mmol) of $Eu_2O_3$, and 0.196 g (2.00 mmol) of $NH_4Br$ as a flux were respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor powder of the above composition.

Next, another phosphor, $Sr_{1.97}MgSi_2O_7:Eu_{0.03}$, having the base composition was synthesized. For the synthesis of a phosphor, in the same manner as described above, 1.454 g (9.85 mmol) of $SrCO_3$, 0.481 g (5.00 mmol) of $MgCO_3$, 0.601 g (10.00 mmol) of $SiO_2$, 0.0264 g (0.075 mmol) of $Eu_2O_3$, and 0.196 g (2.00 mmol) of $NH_4Br$ as a flux were respectively weighed and fully mixed in an agate mortar.

Thereafter, the obtained mixture was charged into a heat-resistant vessel and heated for 2 hours at 600° C. in atmosphere. Thereafter, it was further heated for 3 hours at 1200° C. in a reducing atmosphere. The obtained product was pulverized, washed with water and dried so as to obtain a silicate phosphor powder of the above composition.

Next, in a same manner as the first embodiment, measurements of the emission spectra of the obtained phosphors $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, $(Ca_{0.3}Sr_{0.7})_{1.97}MgSi_2O_7:Eu_{0.03}$, and $Eu^{2+}$-activated silicate phosphor, $Ca_{1.97}MgSi_2O_7:Eu_{0.03}$ and $Mg_{1.97}MgSi_2O_7:Eu_{0.03}$, having the base compositions were carried out by using a vacuum ultraviolet light excimer lamp having a central emission wavelength of 172 nm as a light source according to an established rule.

As a result, the emission spectra of $(Ca_{0.5}Sr_{0.5})_{1.97}MgSi_2O_7:Eu_{0.03}$ which is an example of the aforementioned $Eu^{2+}$-activated silicate green-emitting phosphor and $Ca_{1.97}MgSi_2O_7:Eu_{0.03}$ and $Sr_{1.97}MgSi_2O_7:Eu_{0.03}$ having the base compositions are shown FIG. 8.

In FIG. 8, in order to write them simply, the emission spectrum of the phosphor $(Ca_{0.5}Sr_{0.5})_{1.97}MgSi_2O_7:Eu_{0.03}$ is shown as "$(Ca_{0.5}Sr_{0.5})_{1.97}MgSi_2O_7:Eu$", the emission spectrum of the phosphor $Ca_{1.97}MgSi_2O_7:Eu_{0.03}$ as "$Ca_2MgSi_2O_7:Eu$", and the emission spectrum of the phosphor $Sr_{1.97}MgSi_2O_7:Eu_{0.03}$ as "$Sr_2MgSi_2O_7:Eu$". The emission spectrum of any phosphor had a similar spectrum shape and it was a one-peak type emission spectrum which has one maximum value and where the base thereof broadens toward both sides.

Afterward, according to the emission spectrum of each aforementioned phosphor, the wavelength position of the maximum of the emission band was read and evaluated in order to understand the position of the entire emission spectrum and the position of the maximum of the emission band.

As a result, the wavelength of the maximum of the emission band of the phosphor $(Ca_{0.9}Sr_{0.1})_{1.97}MgSi_2O_7:Eu_{0.03}$ was 532 nm. The wavelength of the maximum of the emission band of the phosphor $(Ca_{0.8}Sr_{0.2})_{1.97}MgSi_2O_7:Eu_{0.03}$ was 524 nm. The wavelength of the maximum of the emission band of the phosphor $(Ca_{0.7}Sr_{0.3})_{1.97}MgSi_2O_7:Eu_{0.03}$ was 520 nm. The wavelength of the maximum of the emission band of the phosphor $(Ca_{0.6}Sr_{0.4})_{1.97}MgSi_2O_7:Eu_{0.03}$ was 512 nm. The wavelength of the maximum of the emission band of the phosphor $(Ca_{0.5}Sr_{0.5})_{1.97}MgSi_2O_7:Eu_{0.03}$ was 504 nm. The wavelength of the maximum of the emission band of the phosphor $(Ca_{0.4}Sr_{0.6})_{1.97}MgSi_2O_7:Eu_{0.03}$ was 496 nm. The wavelength of the maximum of the emission band of the phosphor $(Ca_{0.3}Sr_{0.7})_{1.97}MgSi_2O_7:Eu_{0.03}$ was 492 nm. Moreover, the wavelength of the maximum of the emission band of the $Eu^{2+}$-activated silicate phosphor $Ca_{1.97}MgSi_2O_7:Eu_{0.03}$ having the base composition was 540 nm. Moreover, the wavelength of the maximum of the emission band of the $Eu^{2+}$-activated silicate phosphor $Sr_{1.97}MgSi_2O_7:Eu_{0.03}$ having the base composition was 468 nm. The above-mentioned results were summarized in FIG. 9.

As described above, it can be understood from the results of $(Ca_{0.5}Sr_{0.5})_{1.97}MgSi_2O_7:Eu_{0.03}$ shown in FIG. 8 that the emission spectra of the phosphors $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$ appeared so as to be in the wavelength region between each maximum of the emission band of $Ca_{1.97}MgSi_2O_7:Eu_{0.03}$ and $Sr_{1.97}MgSi_2O_7:Eu_{0.03}$ having the base compositions. With the increase in the ratio of the Sr component in each phosphor, it was understood that the emission spectrum shifts correspondingly to the shorter wavelength side.

The color characteristics of the emission were evaluated by using a vacuum ultraviolet light excimer lump having a central emission wavelength of 172 nm as an excitation light source according to an established rule.

As for the results, the chromaticity (x, y) of the emission color of the phosphor $(Ca_{0.9}Sr_{0.1})_{1.97}MgSi_2O_7:Eu_{0.03}$ was (x, y)=(0.335, 0.587). The chromaticity (x, y) of the emission color of the phosphor $(Ca_{0.8}Sr_{0.2})_{1.97}MgSi_2O_7:Eu_{0.03}$ was (x, y)=(0.306, 0.593). The chromaticity (x, y) of the emission color of the phosphor $(Ca_{0.7}Sr_{0.3})_{1.97}MgSi_2O_7:Eu_{0.03}$ was (x, y)=(0.274, 0.587). The chromaticity (x, y) of the emission color of the phosphor $(Ca_{0.6}Sr_{0.4})_{1.97}MgSi_2O_7:Eu_{0.03}$ was (x, y)=(0.245, 0.569). The chromaticity (x, y) of the emission color of the phosphor $(Ca_{0.5}Sr_{0.5})_{1.97}MgSi_2O_7:Eu_{0.03}$ was (x, y)=(0.212, 0.531). The chromaticity (x, y) of the emission color of the phosphor $(Ca_{0.4}Sr_{0.6})_{1.97}MgSi_2O_7:Eu_{0.03}$ was (x, y)=(0.184, 0.476). The chromaticity (x, y) of the emission color of the phosphor $(Ca_{0.3}Sr_{0.7})_{1.97}MgSi_2O_7:Eu_{0.03}$ was (x, y)=(0.161, 0.408). Moreover, the chromaticity (x, y) of the emission color of the $Eu^{2+}$-activated silicate phosphor $Ca_{1.97}MgSi_2O_7:Eu_{0.03}$ having the base composition was (x, y)=(0.366, 0.581). Furthermore, the chromaticity (x, y) of the emission color of $Sr_{1.97}MgSi_2O_7:Eu_{0.03}$ was (x, y)=(0.133, 0.171). The aforementioned results were summarized in FIG. 9 as the chromaticity x and chromaticity y for each phosphor. And, as shown in FIG. 11, the chromaticity (x, y) of each phosphor was plotted on XYZ chromaticity coordinates.

According to the obtained results, it was understood that the color of each phosphor, $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7$:

$Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}MgSi_2O_7:Eu_{0.03}$, gradually changes corresponding to the mole fraction of Sr included therein, between the color of the $Eu^{2+}$-activated silicate phosphor $Ca_{1.97}MgSi_2O_7:Eu_{0.03}$ and the color of the $Sr_{1.97}MgSi_2O_7:Eu_{0.03}$ where all the Ca components are substituted by Sr components.

Next, the relative photoluminescent brightness where the $Eu^{2+}$-activated silicate phosphor $Ca_{1.97}MgSi_2O_7:Eu_{0.03}$ having the base component is used as the standard was evaluated by using a vacuum ultraviolet light excimer lump having a central emission wavelength of 172 nm as an excitation light source. The measurement was carried out according to an established rule and the measurement value of the luminance of the phosphor $Ca_{1.97}MgSi_2O_7:Eu_{0.03}$ was assumed to be the standard value=100. And the relative photoluminescent brightness of other phosphor was evaluated.

As for the results, the relative photoluminescent brightness of the phosphor $(Ca_{0.9}Sr_{0.1})_{1.97}MgSi_2O_7:Eu_{0.03}$ was 116. The relative photoluminescent brightness of the phosphor $(Ca_{0.8}Sr_{0.2})_{1.97}MgSi_2O_7:Eu_{0.03}$ was 114. The relative photoluminescent brightness of the phosphor $(Ca_{0.7}Sr_{0.3})_{1.97}MgSi_2O_7:Eu_{0.03}$ was 128. The relative photoluminescent brightness of the phosphor $(Ca_{0.6}Sr_{0.4})_{1.97}MgSi_2O_7:Eu_{0.03}$ was 103. The relative photoluminescent brightness of the phosphor $(Ca_{0.5}Sr_{0.5})_{1.97}MgSi_2O_7:Eu_{0.03}$ was 103. The relative photoluminescent brightness of the phosphor $(Ca_{0.4}Sr_{0.6})_{1.97}MgSi_2O_7:Eu_{0.03}$ was 95. And, the relative photoluminescent brightness of the phosphor $(Ca_{0.3}Sr_{0.7})_{1.97}MgSi_2O_7:Eu_{0.03}$ was 83. Moreover, the relative photoluminescent brightness of the $Eu^{2+}$-activated silicate phosphor $Sr_{1.97}MgSi_2O_7:Eu_{0.03}$ having the base composition was 63.

Figure 12:
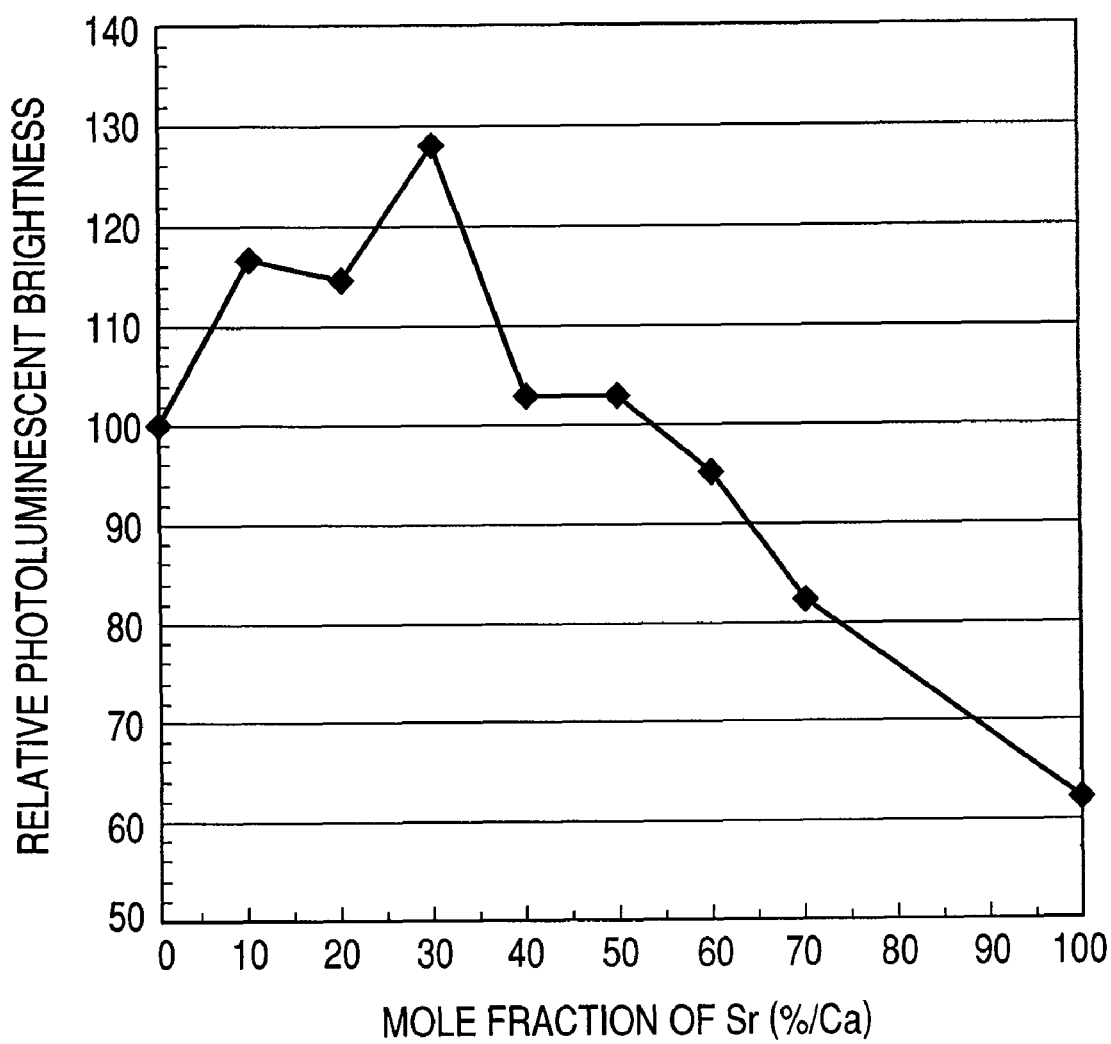
FIG. 12 is a viewgraph illustrating plots of relative photoluminescent brightness of the novel $Eu^{2+}$-activated silicate green-emitting phosphor and a phosphor having the base composition constituting a PDP device of an embodiment of the present invention relative to the mole fraction of the Sr component (%/Ca) contained in each phosphor.

The aforementioned results are summarized in FIG. 9 and FIG. 12. Therefore FIG. 12 is a graph in which the photoluminescent brightness of each phosphor is evaluated under the assumption that the luminance of the phosphor $Ca_{1.97}MgSi_2O_7:Eu_{0.03}$ having the base component has the standard value of 100, is plotted against the mole fraction (%/Ca) of the Sr component included therein relative to the Ca component in the examples of $Eu^{2+}$-activated silicate green-emitting phosphors of the present invention: $(Ca_{0.9}Sr_{0.1})_{1.97}MgSi_2O_7:Eu_{0.03}$, $(Ca_{0.8}Sr_{0.2})_{1.97}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{1.97}MgSi_2O_7:Eu_{0.03}$, $(Ca_{0.5}Sr_{0.5})_{1.97}MgSi_2O_7:Eu_{0.03}$, $(Ca_{0.4}Sr_{0.6})_{1.97}MgSi_2O_7:Eu_{0.03}$, and $(Ca_{0.3}Sr_{0.7})_{1.97}gSi_2O_7:Eu_{0.03}$, and the phosphor $Sr_{1.97}MgSi_2O_7:Eu_{0.03}$ having the base component. In FIG. 12, the mole fraction of the Sr component relative to the Ca component in each phosphor is expressed as a percent (%). Therefore, the mole fraction of the Sr component of $Ca_{1.97}MgSi_2O_7:Eu_{0.03}$ is shown as "0%" and $Sr_{1.97}MgSi_2O_7:Eu_{0.03}$ as 100%"; and the mole fraction of Sr component of $(Ca_{0.5}Sr_{0.5})_{1.97}MgSi_2O_7:Eu_{0.03}$ is shown as "50%".

In $(Ca_{0.9}Sr_{0.1})_{1.97}MgSi_2O_7:Eu_{0.03}$, $(Ca_{0.8}Sr_{0.2})_{197}MgSi_2O_7:Eu_{0.03}$, $(Ca_{0.7}Sr_{0.3})_{1.97}MgSi_2O_7:Eu_{0.03}$, $(Ca_{0.6}Sr_{0.4})_{197}MgSi_2O_7:Eu_{0.03}$, $(Ca_{0.5}Sr_{0.5})_{197}MgSi_2O_7:Eu_{0.03}$, $(Ca_{0.4}Sr_{0.6})_{1.97}MgSi_2O_7:Eu_{0.03}$, the luminance is equal to or greater, compared with the $Eu^{2+}$-activated silicate phosphor $Ca_{1.97}MgSi_2O_7:Eu_{0.03}$ having the base composition. Among these, it was understood that the $(Ca_{0.0}Sr_{0.1})_{1.97}MgSi_2O_7:Eu_{0.03}$, $(Ca_{0.8}Sr_{0.2})_{1.97}MgSi_2O_7:Eu_{0.03}$, and $(Ca_{0.7}Sr_{0.3})_{1.97}MgSi_2O_7:Eu_{0.03}$ have extremely high luminance. And the phosphor $(Ca_{0.7}Sr_{0.3})_{1.97}MgSi_2O_7:Eu_{0.03}$ had the highest luminance.

Third Embodiment

A PDP was prepared by using the $Eu^{2+}$-activated silicate phosphor $(Ca_{0.7}Sr_{0.3})_{1.97}MgSi_2O_7:Eu_{0.03}$ explained in the second embodiment as a green-emitting phosphor constituting a green color phosphor layer.

The configuration and the method of preparation thereof were the same as the PDO 100 shown in the first embodiment, but particles of the phosphor $(Ca_{0.7}Sr_{0.3})_{1.97}MgSi_2O_7:Eu_{0.03}$ explained in the second embodiment were used for the phosphor particles included in the green phosphor layer 10. Therefore, since details of the other configuration and the method of preparation of the PDP and the PDP device with regard to the third embodiment are omitted, only the main parts will be briefly explained referring to the corresponding parts of FIG. 4 to FIG. 7. Note that the corresponding same components in the PDP configuration are denoted by the same reference symbols throughout the drawings for describing the embodiment, and a repetitive description hereof will be omitted.

A PDP in the third embodiment consists of substrates 1 and 6, electrodes 2 and 9, bus-electrodes 3, the dielectric layer 4, the protective layer 5, and the barrier ribs 7 as understood from FIG. 4, etc. the same as the first embodiment. Next, each phosphor layer 10 of red, green, and blue was formed on the barrier ribs 7, in order, in a stripe-like shape so as to cover a grooved surface between the barrier ribs 7.

Here, each phosphor layer 10 corresponds to red, green, and blue, and they were respectively formed by preparing a phosphor paste by mixing 40 parts by weight of a red-emitting phosphor particle (60 parts by weight of vehicle), 40 parts by weight of a green-emitting phosphor particle (60 parts by weight of vehicle), and 35 parts by weight of a green-emitting phosphor particle (65 parts by weight of vehicle). After applying them by screen printing, they were subjected to drying and heating to evaporate volatile components and burn-off organic substances in the phosphor paste. The phosphor particles used in the phosphor layers 10 of the third embodiment have a mean particle diameter of about 3 μm, the same as the first embodiment.

Moreover, as far as the material of the phosphors other than green, the red-emitting phosphor is a 1:1 mixture of a (Y, Gd)$BO_3$:Eu phosphor and $Y_2O_3$:Eu phosphor, and the blue-emitting phosphor is a BAM $(BaMgAl_{10}O_{17}:Eu^{2+})$ phosphor, the same as the first embodiment.

Next, a discharge gas was a gas mixture mainly containing Xe gas having a mole fraction of 10%. The PDP 100 according to the third embodiment had a type 3 size and a single pixel had a pitch of 1000 μm×1000 μm, the same as the first embodiment.

Next, a plasma display device was prepared by using this PDP, and it was configured for displaying images in combination with a driving circuit for driving the PDP the same as the first embodiment.

The plasma display device had high luminance and the emission of green color was excellent, and the display performance was better when compared with the PDP device of the first embodiment. With regard to the decay characteristics of green, the decay time was as short as 1 ms and equal to the characteristics of the blue-emitting phosphor used for the plasma display device.

As a result, the problem in the conventional plasma display device prepared by using a conventional $Mn^{2+}$-activated zinc silicate phosphor $Zn_2SiO_4$:Mn, that is, the generation of the phenomenon where the previous image, the green color, remains on the display in spite of the display being switched could be sufficiently suppressed, resulting in a superior video display being achieved.

The discharge gas of the PDP used in the PDP device of the third embodiment is a gas mixture containing Xe gas with a mole fraction of 10%, and it is more preferable that a gas mixture contains Xe gas having a mole fraction of 6% or more. A PDP device having high luminance and high emission efficiency can be provided by using a gas mixture containing Xe gas with a mole fraction of 12% or more, which is a higher mole fraction of Xe gas than that of the third embodiment.

The PDP of the third embodiment of the present invention is prepared by using the aforementioned novel $Eu^{2+}$-activated silicate green-emitting phosphor, and a PDP having excellent decay characteristics is enabled in the mode where it is combined with a $Mn^{2+}$-activated zinc silicate phosphor $Zn_2SiO_4$:Mn having poor decay characteristics and substitutes a part of the green-emitting phosphor, the same as the first embodiment.

In this case, it is preferable that the mixture ratio thereof be controlled to (novel $Eu^{2+}$-activated silicate green-emitting phosphor)/($Zn_2SiO_4$:Mn)≧1, that is, the ratio of the novel $Eu^{2+}$-activated silicate green-emitting phosphor of the present invention is assumed to be more than the half, the same as the first embodiment. Since the decay time of the phosphor $Zn_2SiO_4$:Mn is about 10 ms and that of the novel $Eu^{2+}$-activated silicate green-emitting phosphor is about 1 ms, the decay time can be controlled to be about 5 ms or less by making this composition ratio, and the phenomenon where the green color remains on the display after switching the display can be reduced so that the viewers cannot recognize it.

Moreover, a PDP can be prepared by mixing the novel $Eu^{2+}$-activated silicate green-emitting phosphors of the present invention with one or more phosphors selected from the group consisting of (Y, Gd, Sc)$_2$SiO$_5$:Tb, (Y, Gd)$_3$(Al, Ga)$_5$O$_{12}$:Tb, (Y, Gd)$_3$(Al, Ga)$_5$O$_{12}$:Ce, (Y, Gd)B$_3$O$_6$:Tb and (Y, Gd)PO$_4$:Tb as a substitute for the $Mn^{2+}$-activated zinc silicate phosphor $Zn_2SiO_4$:Mn.

Although detailed investigation results are not described for the red and blue phosphors in the third embodiment, a PDP can be prepared in the same manner also with the phosphors of each composition listed below.

For example, as the red-emitting phosphor, at least one phosphor selected from the group consisting of (Y, Gd)BO$_3$:Eu, (Y, Gd)$_2$O$_3$:Eu and (Y, Gd) (P, V)O$_4$:Eu can be used. And as the blue-emitting phosphor, at least one phosphor selected from the group consisting of CaMgSi$_2$O$_6$:Eu, Ca$_3$MgSi$_2$O$_8$:Eu, Ba$_3$MgSi$_2$O$_8$:Eu, and Sr$_3$MgSi$_2$O$_8$:Eu can be used. Furthermore, a combination with a phosphor not shown here is applicable.

In the foregoing, the invention made by the inventors of the present invention has been concretely described based on the embodiments. However, it is needless to say that the present invention is not limited to the foregoing embodiments and various modifications and alterations can be made within the scope of the present invention.

A PDP of the present invention can be used for high performance video displays based on the phosphor materials having high luminance and short decay, and furthermore, it can be utilized for large home use flat panel display devices which require high luminance and excellent video characteristics when configuring a larger PDP device.

What is claimed is:

1. A plasma display device comprising:
a pair of substrates arranged at a distance so as to face each other;
barrier ribs arranged between said pair of substrates for forming a space between said pair of substrates;
an electrode pair arranged over at least one facing side of said pair of substrates;
a discharge gas sealed in the space formed by said barrier ribs for generating ultraviolet light as a result of electric discharge upon application of a voltage to said electrode pair; and
a phosphor layer containing a phosphor for emitting light as a result of excitation by said ultraviolet light formed over at least one of the facing sides of the pair of substrates and wall surfaces of said barrier ribs in the space,
wherein the phosphor contains a $Eu^{2+}$-activated silicate green-emitting phosphor represented by the following general formula (1):

$$(Ca_{1-x}M1_x)_{2-e}M2.Si_2O_7:Eu_e \qquad (1)$$

(wherein M1 is at least one element selected from the group consisting of Sr and Ba; M2 is at least one element selected from the group consisting of Mg and Zn; and x indicates the mole fraction of the component M1 and e indicates the mole fraction of Eu respectively satisfy the following conditions: 0<x<1 and 0.001≦e≦0.2).

2. The plasma display device according to claim 1, wherein said discharge gas contains Xe gas in a mole fraction of 6% or more.

3. The plasma display device according to claim 1, wherein said discharge gas contains Xe gas in a mole fraction of 10% or more.

4. The plasma display device according to claim 1, wherein said discharge gas contains Xe gas in a mole fraction of 12% or more.

5. The plasma display device according to claim 1, wherein a phosphor layer of either a red-emitting phosphor, a green-emitting phosphor, or a blue-emitting phosphor is formed in each space, and the green-emitting phosphor includes the $Eu^{2+}$-activated silicate green-emitting phosphor represented by the general formula (1).

6. The plasma display device according to claim 5, wherein the green-emitting phosphor includes, in addition to the $Eu^{2+}$-activated silicate green-emitting phosphor represented by the general formula (1), at least one phosphor selected from the group consisting of Zn$_2$SiO$_4$:Mn, (Y, Gd, Sc)$_2$SiO$_5$:Tb, (Y, Gd)$_3$(Al, Ga)$_5$O$_{12}$:Tb, (Y, Gd)$_3$(Al, Ga)$_5$O$_{12}$:Ce, (Y, Gd)B$_3$O$_6$:Tb, and (Y, Gd)PO$_4$:Tb.

7. The plasma display device according to claim 5, wherein the red-emitting phosphor includes at least one phosphor selected from the group consisting of (Y, Gd)BO$_3$:Eu, Y$_2$O$_3$:Eu, (Y, Gd)$_2$O$_3$:Eu, and (Y, Gd) (P, V)O$_4$:Eu, and the blue-emitting phosphor includes at least one phosphor selected from the group consisting of BaMgAl$_{10}$O$_{17}$:Eu, CaMgSi$_2$O$_6$:Eu, and Sr$_8$MgSi$_2$O$_8$:Eu.

8. The plasma display device according to claim 1, wherein the phosphor contains a $Eu^{2+}$-activated silicate green-emitting phosphor represented by the following general formula (2)

$$(Ca_{1-x}Sr_x)_{2-e}M3.Si_2O_7:Eu_e \qquad (2)$$

(wherein M3 is at least one element selected from the group consisting of Mg and Zn; and x indicates the mole fraction of the component Sr and e indicates the mole fraction of Eu respectively satisfy the following conditions: $0.1 \leq x \leq 0.6$ and $0.001 \leq e \leq 0.2$).

9. The plasma display device according to claim 8, wherein the mole fraction X of the component Sr of the $Eu^{2+}$-activated silicate phosphor represented by the aforementioned general formula (2) satisfies the following condition: $0.2 \leq x \leq 0.6$.

10. The plasma display device according to claim 8, wherein the mole fraction x of the component Sr of the $Eu^{2+}$-activated silicate phosphor represented by the aforementioned general formula (2) satisfies the following condition: $0.2 \leq x \leq 0.5$.

11. The plasma display device according to claim 8, wherein the mole fraction x of the component Sr of the $Eu^{2+}$-activated silicate phosphor represented by the aforementioned general formula (2) satisfies the following condition: $0.2 \leq x \leq 0.4$.

12. A plasma display device comprising:

a pair of substrates arranged at a distance so as to face each other;

barrier ribs arranged between said pair of substrates for forming a space between said pair of substrates;

an electrode pair arranged over at least one facing side of said pair of substrates;

a discharge gas sealed in the space formed by said barrier rib for generating ultraviolet light as a result of electric discharge upon application of a voltage to said electrode pair; and a phosphor layer containing a phosphor for emitting light as a result of excitation by said ultraviolet light formed over at least one of the facing sides of the pair of substrates and wall surfaces of said barrier ribs in the space, wherein the phosphor contains an $Eu^{2+}$-activated silicate green-emitting phosphor; the $Eu^{2+}$-activated silicate green-emitting phosphor is represented by the following general formula (3); and light is emitted upon excitation by the ultraviolet light with a color having a chromaticity (x, y) in the XYZ color system of CIE where the x is $0.15 \leq x$ value $\leq 0.35$ and the y is $0.45 \leq y$ value $\leq 0.75$:

$$(Ca_{1-x}M1_x)_{2-e}.M2.Si_2O_7:Eu_e \qquad (3)$$

(wherein M1 is at least one element selected from the group containing Sr and Ba; M2 is at least one element selected from the group containing Mg and Zn; and x indicates the mole fraction of the component M1 and e indicates the mole fraction of Eu respectively satisfy the following conditions: $0<x<1$ and $0 \leq e \leq 1$).

13. The plasma display device according to claim 12, wherein said discharge gas contains Xe gas in a mole fraction of 6% or more.

14. The plasma display device according to claim 12, wherein said discharge gas contains Xe gas in a mole fraction of 10% or more.

15. The plasma display device according to claim 12, wherein said discharge gas contains Xe gas in a mole fraction of 12% or more.

* * * * *